United States Patent
Zhang et al.

(10) Patent No.: US 8,233,413 B2
(45) Date of Patent: Jul. 31, 2012

(54) DYNAMIC ADJUSTMENT OF DOWNLINK/UPLINK ALLOCATION RATIO IN TDD WIRELESS SYSTEMS

(75) Inventors: Wenfeng Zhang, San Diego, CA (US); Yonggang Fang, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 447 days.

(21) Appl. No.: 12/367,467

(22) Filed: Feb. 6, 2009

(65) Prior Publication Data

US 2009/0201838 A1  Aug. 13, 2009

Related U.S. Application Data

(60) Provisional application No. 61/027,412, filed on Feb. 8, 2008.

(51) Int. Cl.
   *H04J 3/00* (2006.01)
(52) U.S. Cl. ...................................................... 370/280
(58) Field of Classification Search .................. 370/203, 370/211–215, 310–328, 329–337, 338–350, 370/395.1, 395.2, 395.4, 400–411, 431–444, 370/521, 276–296, 458–463, 464–502
See application file for complete search history.

(56) References Cited

U.S. PATENT DOCUMENTS

| | | | | |
|---|---|---|---|---|
| 2002/0015393 A1* | 2/2002 | Pan et al. | .................. | 370/335 |
| 2003/0017830 A1* | 1/2003 | Kayama et al. | .................. | 455/450 |
| 2004/0208148 A1* | 10/2004 | Cooper | .................. | 370/336 |
| 2005/0259629 A1 | 11/2005 | Oliver et al. | | |
| 2006/0105773 A1 | 5/2006 | Lin et al. | | |
| 2008/0165724 A1* | 7/2008 | Wu et al. | .................. | 370/320 |
| 2008/0304446 A1 | 12/2008 | Kimura et al. | | |
| 2009/0122731 A1* | 5/2009 | Montojo et al. | .............. | 370/280 |
| 2010/0278083 A1* | 11/2010 | Kwak et al. | .................. | 370/280 |

FOREIGN PATENT DOCUMENTS

| | | |
|---|---|---|
| EP | 1793635 | 6/2007 |
| KR | 10-2007-0094782 | 9/2007 |
| WO | WO 03/034767 | 4/2003 |

OTHER PUBLICATIONS

International Search Report and Written Opinion dated Aug. 28, 2009 for Application No. PCT/US2009/033450, filed Feb. 6, 2009, published as WO 2009/100371 on Aug. 13, 2009, 11 pages.

* cited by examiner

*Primary Examiner* — Kwang B Yao
*Assistant Examiner* — Jung-Jen Liu
(74) *Attorney, Agent, or Firm* — Perkins Coie LLP

(57) ABSTRACT

Techniques, apparatuses, and systems for dynamically changing downlink and uplink allocations can include operating a base station under time division duplexing to communicate with one or more mobile devices using a frame structure, adjusting a downlink-uplink ratio to change an allocation between uplink and downlink data capacities in the frame structure, determining a mute interval based on the adjusted downlink-uplink ratio, generating mute information based on the mute interval to identify the one or more areas of the frame structure effected by the allocation change, and transmitting the mute information to the one or more mobile devices.

25 Claims, 18 Drawing Sheets

DYNAMIC ADJUSTMENT OF DOWNLINK/UPLINK ALLOCATION RATIO IN TDD WIRELESS SYSTEMS

CROSS REFERENCE TO RELATED APPLICATIONS

This application claims the benefit of the priority of U.S. Provisional Application Ser. No. 61/027,412, filed Feb. 8, 2008 and entitled "Dynamic Adjustment of Downlink/Uplink Allocation Ratio in TDD Wireless Systems," the entire contents of which are hereby incorporated by reference.

BACKGROUND

This application relates to wireless communications.

Wireless communication systems such as a wireless Time Division Duplex (TDD) systems can include a network of one or more base stations to communicate with mobile devices such as user equipment (UE), mobile station (MS), cell phone, or wireless air card. Further, a wireless communication system can include a core network to control the base stations.

Wireless TDD systems can support downlink and uplink transmissions on the same carrier frequency in separate non-overlapping time intervals. A base station can transmits a signal, called a downlink signal, to one or more mobile devices. A mobile device can transmit a signal, called an uplink signal, to one or more base stations. A wireless system can allocate downlink and uplink intervals to control downlink and uplink transmissions in a frame.

SUMMARY

This patent application describes technologies that, among other things, dynamically change downlink and uplink allocations for wireless communications.

Techniques for changing dynamically changing downlink and uplink allocations can include establishing a communication link between a base station and a user equipment (the communication link can include downlink intervals for the base station to transmit to the user equipment and uplink intervals for the user equipment to transmit to the base station); and generating a mute interval to replace a downlink interval or an uplink interval in a previous frame to effect a change in a downlink-uplink allocation ratio for a subsequent frame; and transmitting a location of the mute interval to the user equipment using a frame structure. Other implementations can include corresponding systems, apparatus, and computer program products.

Techniques for dynamically changing downlink and uplink allocations can include operating a base station under time division duplexing to communicate with one or more mobile devices using a frame structure, adjusting a downlink-uplink ratio to change an allocation between uplink and downlink data capacities in the frame structure, determining a mute interval based on the adjusted downlink-uplink ratio, generating mute information based on the mute interval to identify the one or more areas of the frame structure effected by the allocation change, and transmitting the mute information to the one or more mobile devices. Other implementations can include corresponding systems, apparatus, and computer program products.

Techniques can include using time division duplexing to communicate with a base station using a frame structure and a first allocation, receiving muting information from the base station indicative of muting activity for a specific area of the frame structure, and indicative of a second allocation that differs from the first allocation, completing operations associated with the specific area under the first allocation; and commencing operations using the second allocation. The frame structure can include uplink and downlink data areas. The first allocation can include a total size of the uplink area and a total size of the downlink area. Other implementations can include corresponding systems, apparatus, and computer program products.

An apparatus can include a transceiver to communicate with one or more mobile devices using a frame structure under time division duplexing and a processing unit, in communication with the transceiver, configured to perform operations including adjusting a downlink-uplink ratio to change an allocation between uplink and downlink data capacities in the frame structure; determining a mute interval based on the adjusted downlink-uplink ratio, the mute interval can include one or more areas of the frame structure; generating mute information based on the mute interval to identify the one or more areas of the frame structure effected by the allocation change; and transmitting the mute information to the one or more mobile devices.

An apparatus can include a transceiver to communicate with a base station; and a processing unit, in communication with the transceiver, configured to perform operations including using time division duplexing to communicate with the base station using a frame structure and a first allocation, receiving muting information from the base station indicative of muting activity for a specific area of the frame structure, and indicative of a second allocation that differs from the first allocation, completing operations associated with the specific area under the first allocation; and commencing operations using the second allocation. The frame structure can include uplink and downlink data areas. The first allocation can include a total size of the uplink area and a total size of the downlink area.

A system for wireless communications can include a controller and one or more base stations. A controller can perform operations including adjusting a downlink-uplink ratio to change an allocation between uplink and downlink data capacities in a frame structure; determining a mute interval based on the adjusted downlink-uplink ratio, the mute interval can include one or more areas of the frame structure; generating mute information based on the mute interval to identify the one or more areas of the frame structure effected by the allocation change. A base station, in communication with the controller, can communicate with one or more mobile devices using the frame structure under time division duplexing and can transmit data including the mute information to the one or more mobile devices.

Particular implementations of the subject matter described in this patent application can be implemented to realize one or more of the following potential advantages. Dynamically changing a downlink-to-uplink (D/U) resource allocation ratio can increase bandwidth efficiency. Additionally, these advantages can include avoiding a synchronized operations between base stations when changing a D/U ratio, e.g., avoiding a synchronized shut-down when changing a D/U ratio; and allowing, either temporarily or permanently, more than one different D/U ratio in a wireless communication system with multiple base stations. Further, these advantages can include minimizing or eliminating a system capacity loss during a D/U ratio change, elimination of an interrupt frame from a network view-point, and/or un-interrupted user traffic.

BRIEF DESCRIPTION OF THE DRAWINGS

Like reference symbols in the various drawings indicate like elements.

DETAILED DESCRIPTION

Figure 1:
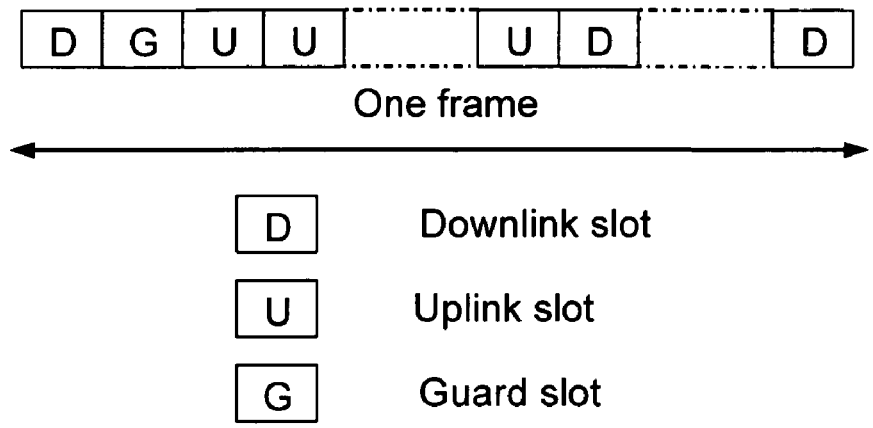
FIG. 1 shows an example of a slot based frame structure.

Wireless TDD systems can use a frame structure to control downlink and uplink transmissions in TDD frame based communications. A frame structure can specify locations or intervals within a frame for downlink and uplink transmissions and guard periods. When switching between downlink and uplink transmissions, TDD communications can use a guard period (GP). In some implementations, base stations and mobile devices may not transmit in a GP. Due to characteristics of some wireless systems such as cellular, switching from a downlink signal to an uplink signal may require a longer GP, while switching from an uplink signal to a downlink signal may require a relatively shorter GP. A wireless TDD system can combine a TDD technique with a multiple access technology such as Code Division Multiple Access (CDMA) or Orthogonal Frequency-Division Multiplexing (OFDM).

Advantages of a TDD system can include the flexibility of bandwidth allocation in an unpaired frequency band, and the flexibility in selecting a downlink-to-uplink resource allocation ratio (D/U ratio). Different traffic service types and changing traffic flows can prompt changes to a D/U ratio.

However, TDD systems requiring a uniform and static D/U ratio may not be able to adapt to different traffic service types, changing traffic flows, or different downlink/uplink usages in different service areas. For example, some implementations of a TDD system require system-wide synchronization of a D/U ratio, e.g., when a base station transmits on a downlink, a mobile device does not transmit but receives signals, and when the mobile device transmits on the uplink, the base station turns off the base station's transmitter and receives signals. Further, in some TDD implementations, base stations and mobile devices can transmit and receive according to a system wide timing schedule in order to avoid overlaps between downlink and uplink signals in the system.

Some TDD system implementations may be encumbered by having D/U ratio synchronization across a system's base stations and mobile devices because there can be only one D/U ratio per carrier frequency system-wide in such systems. Further, once a D/U ratio is determined for such a system, it may be difficult and time consuming to change the D/U ratio to other values. For example, before changing a D/U ratio in a synchronized fashion, each transmitter has to first either turn off the transmission all together, or, in order to keep the continuity of unfinished traffic, gradually reduces its own transmission volume to zero and then possibly wait a long time for other transmitters to completely shut down. As a result, such systems may waste a large amount of system capacity. In addition to a loss of traffic volume, the monitoring and management of unfinished traffic in such a system may be expensive and/or time consuming.

This application describes implementations of and examples for transmission and reception of signals in a TDD system, where the downlink and uplink wireless signals are transmitted on the same carrier frequency but in different time durations. The TDD system can be implemented in a wireless environment. The examples and implementations of wireless communication apparatus, techniques, and systems in this application can dynamically change a downlink to uplink resource allocation ratio in the time domain. These apparatus, techniques, and systems can avoid a synchronized shut-down when changing the downlink/uplink (D/U) ratio and can allow more than one different D/U ratio in the system, either temporarily or permanently.

In addition, these apparatus, techniques, and systems can be used in various scenarios. These scenarios can include when a network needs to switch from an old D/U allocation ratio to a new D/U allocation and when the network needs to keep the D/U allocation ratio of one service area differently from a D/U allocation ratio of a neighboring service area.

Different wireless TDD systems can use different types of frame structures to control downlink and uplink transmissions in TDD frame based communications. Examples of frame structure types include a slot based frame structure, e.g., slot-TDD frame, and a symbol based frame structure, e.g., symbol-TDD frame.

FIG. 1 shows an example of a slot based frame structure. A slot based frame structure such as a slot-TDD frame can include one or more of downlink slot, uplink slot, and guard slot. In some implementations, a slot based frame structure implementation can specify a fix-length radio frame and can include multiple slots. Each slot can potentially be used for a downlink transmission, an uplink transmission, or a guard period following a downlink slot and an leading uplink slot. A downlink slot or an uplink slot can include one or more data symbols and can have the same slot length in time. Multiple mobile devices can share radio resources within a downlink slot or uplink slot. Components such as a core network or a scheduler located on a base station can control a multiple-access scheme including the scheduling of radio resources.

Wireless systems such as 3GPP and 3GPP2 systems, e.g., TD-SCDMA, LTE-TDD, and UMB-TDD, can use a slot based frame structure.

Figure 2:
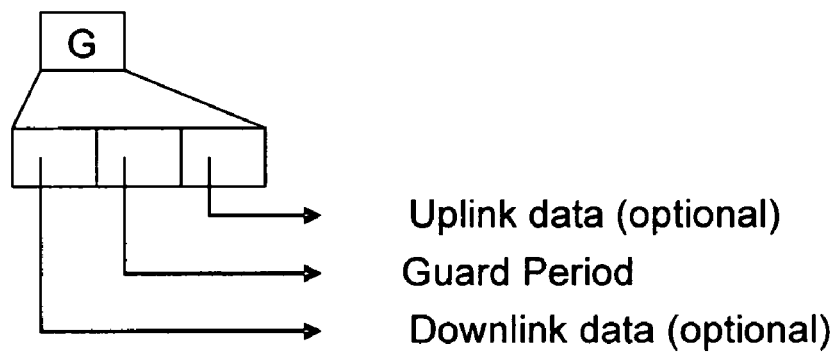
FIG. 2 shows an example of a guard slot structure.

FIG. 2 shows an example of a guard slot structure. A slot used for a guard period is called a guard slot. A guard slot can have a different interval from that of a uplink or downlink slot. In some implementations, a guard slot's position within a frame is fixed. A guard slot can include a guard period and one or more optional data portions. In some implementations, a data portion proceeding a guard period is for a downlink signal, and a data portion following the guard period is for an uplink signal. The guard period when switching from uplink to downlink can be relatively short. Some implementations can create a guard period by removing several last data symbols within the uplink slot that is prior to the downlink slot.

The number of downlink slots to the number of uplink slots in a frame structure is related to a D/U ratio. A base station can use one or more downlink slots or can use a communication channel such as a broadcast channel to communicate downlink and uplink slot assignments. A wireless system can reserve downlink radio resources in a frame for broadcasting D/U allocation information.

Figure 3:
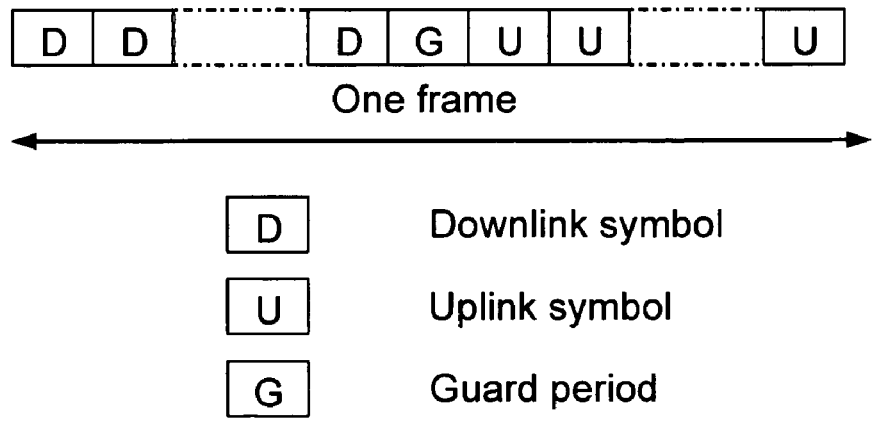
FIG. 3 shows an example of a symbol based frame structure.

FIG. 3 shows an example of a symbol based frame structure. A symbol based frame structure such as a symbol-TDD frame structure can include one or more of downlink symbol, uplink symbol, and guard period. In some implementations, a symbol based frame structure implementation can specify a fix-length radio frame and specifies a period for transmission of downlink symbols, a guard period, and a period for transmission of uplink symbols. Multiple mobile devices can share radio resources over downlink symbols or uplink symbols. Components such as a core network or a scheduler located on a base station can control a multiple-access scheme including the scheduling of radio resources. A guard period can have a fixed time duration. The position of a guard period within a frame can depend on the number of downlink symbols preceding the guard period.

The number of downlink symbols to the number of uplink symbols in a frame structure is related to a D/U ratio. Accordingly, the position of a guard period is also related to the D/U ratio. When switching from uplink to downlink in a frame, some implementations can create a guard period by removing several last uplink symbols within the frame. A base station can use one or more downlink symbols or can use a communication channel such as a broadcast channel to communicate the number of downlink/uplink symbols in a frame or the GP position in a frame. A wireless system can reserve downlink radio resources in a frame for broadcasting D/U allocation information. Wireless systems such as IEEE 802.16 (WiMAX) can use a symbol based frame structure.

Wireless communication systems can employ one or more mute intervals to signal a D/U allocation change. A frame structure can include one or more mute intervals in addition to downlink interval(s), uplink interval(s), and guard period(s). Different types of frame structure implementations such as slot and symbol based frame structures can use mute intervals.

In a slot-TDD frame structure, a mute interval can include one or more slots. A slot for a mute interval is known as a mute slot. A frame based on a slot based frame structure can have one or more mute slots. In some implementations, a mute slot is similar to the downlink and uplink slots as shown in FIG. 1. Indicating a downlink slot or an uplink slot as a mute slot can signal a change in D/U allocation. In some implementations, once a downlink or uplink slot is marked as a mute slot, the slot can not be used for new user traffic transmission, until the slot is marked differently, e.g., marked as a downlink slot or uplink slot. Radio stations such as a base station or a mobile device can response to a mute slot, for example, by completing current traffic transmissions that utilize the mute slot or by stopping all existing transmissions that utilize the mute slot immediately. A wireless system can transit a downlink slot to an uplink slot, or vice versa, by marking the slot as a mute slot and waiting for all existing transmission within that slot to terminate.

A mute slot can differ from a guard slot. In some implementations, the time duration of a mute slot is equal to that of a downlink/uplink slot, while a guard slot may not have such a requirement. In some implementations, a mute slot shall have no new transmission signal during the whole slot and the mute slot has its traffic volume decreasing to zero, while a guard slot can have an optional data portion for downlink and/or uplink transmission. In some implementations, a mute slot can be any downlink slot or an uplink slot within a frame structure, and a network can dynamically allocate and signal one or more of the downlink and uplink slots as a mute slot(s), while a guard slot can have a static position within a frame structure.

In a symbol-TDD frame structure, a mute interval can include one or more symbols. A symbol for a mute interval is known as a mute symbol. A frame based on a symbol based frame structure can have one or more mute symbols. In some implementations, a mute symbol is similar to downlink and uplink symbol as shown in FIG. 3. In some implementations, once a downlink or uplink symbol is marked as mute symbol, the symbol can not be used for new user traffic transmission, until the symbol is marked differently, e.g., marked as a downlink symbol or uplink symbol. Radio stations such as a base station or a mobile device can response to a mute symbol, for example, by completing current traffic transmissions that utilize the mute symbol or by stopping all existing transmissions that utilize the mute symbol immediately. A wireless system can transit a downlink symbol to an uplink symbol, or vice versa, by marking the symbol as a mute symbol and waiting for all existing transmission within that symbol to terminate.

A mute symbol can differ from a guard period. In some implementations, the time duration of a mute symbol is equal to that of a downlink or uplink symbol, while a guard period has no such requirement. In some implementations, a core network can explicitly signal the number and position of the mute symbols within a frame structure, while the guard symbol has a specific position within a radio frame implicitly derived from the number of downlink symbols in the radio frame.

A wireless communication system can explicitly signal one or more mute intervals, e.g., signaling of mute slot(s) in a slot-TDD frame or mute symbol(s) in symbol-TDD frame. Wireless systems such as a cellular system can require explicit signaling of mute intervals.

A base station, for example, can transmit common reference signals and common control information along with downlink user traffic on a downlink channel. A downlink scheduler on the base station side can control the transmission of downlink user traffic. A wireless system may not be able to turn off the transmission of common reference signals for synchronization and tracking as well as the channel quality measurement performed in user equipment. In some implementation, once a system plans to switch a specific downlink interval, e.g., slot or symbol, to an uplink interval, e.g., slot or symbol, the system can operate one or more radio stations to cease radio signal emission including the common reference signal in the effected interval. User equipment may not be aware of the loss of common reference signal without explicit signaling of this change and, as a result, may incorrectly perform synchronization/tracking and channel measurements.

User equipment, for example, can transmit autonomously data traffic or random access attempts on an uplink channel, e.g., an uplink channel in a cellular system. As a result, a base station or a scheduler may not completely control uplink transmissions. Therefore, once a system plans to switch an uplink interval to a downlink interval, the system has to wait for user equipment to cease radio signal emissions in the effected interval. User equipment in an autonomous transmission status may still transmit signals in the effected interval without explicit signaling of the change. In addition, a base station can schedule uplink transmissions from certain user equipment as persistent, e.g., there can be multiple persistently scheduled user equipment transmissions in the effected intervals. A system may require a large amount of downlink resources to send individual scheduling information to each of these user equipments to stop the persistent transmissions in the effected intervals. Thus, it may be advantageous to broadcast a single signaling message on a downlink to stop multiple persistent uplink transmissions in the effected intervals.

A downlink channel such as a broadcast channel can carry explicit signaling to inform one or more mobile devices of the location of a mute interval(s) within a radio frame. Further, techniques for signaling a mute interval can differ between implementations with different frame structures such as slot and symbol frame structures. Slot-TDD frame structure implementations, for example, can use a slot mask method, a slot list method, or a pre-defined allocation table entry (ATE) method. Whereas, symbol-TDD frame structure implementations, for example, can use a symbol set method or a symbol list method.

Figure 4:
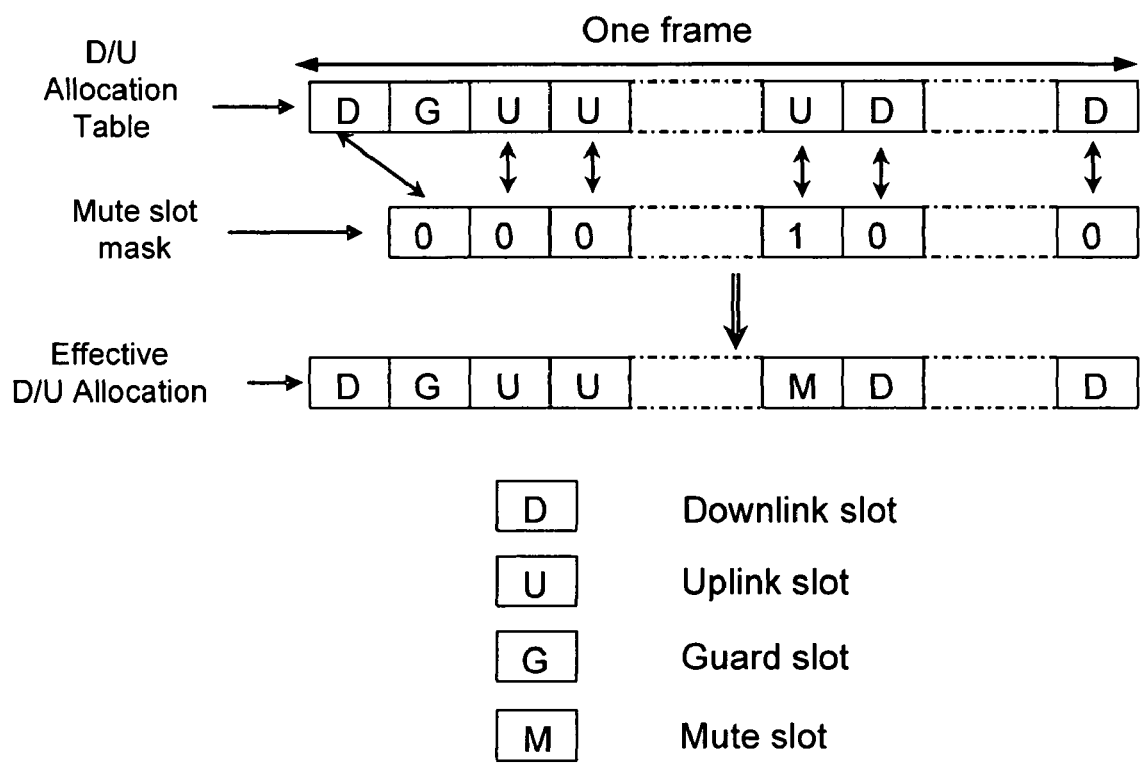
FIG. 4 shows an example of mute slot signaling using a slot mask.

FIG. 4 shows an example of mute slot signaling using a slot mask. A slot mask method can include broadcasting an N-bit mask, where N is equal to the total number of downlink and uplink slots in a frame, along with an existing signaling format that indicates a D/U allocation table. The i-th binary bit, $m_i$, in the mask corresponds to i-th data slot in the frame. If $m_i$ is set to 1, the i-th slot in the frame is designated as a mute slot; otherwise, the i-th slot can be used for either downlink or uplink transmissions according to the accompanied D/U allocation table. An N-bit mask can include one or more bits that respectively indicate one or more slots as mute slots. Different implementations can realize different slot mask method implementations. For example, a slot mask can be separate from an allocation table in a frame. In another example, a combined data structure can represent both an allocation table and a slot mask. The combined data structure can include N entries, and each entry can include a bit for a D/U allocation and a bit for a slot mask indication.

Figure 5:
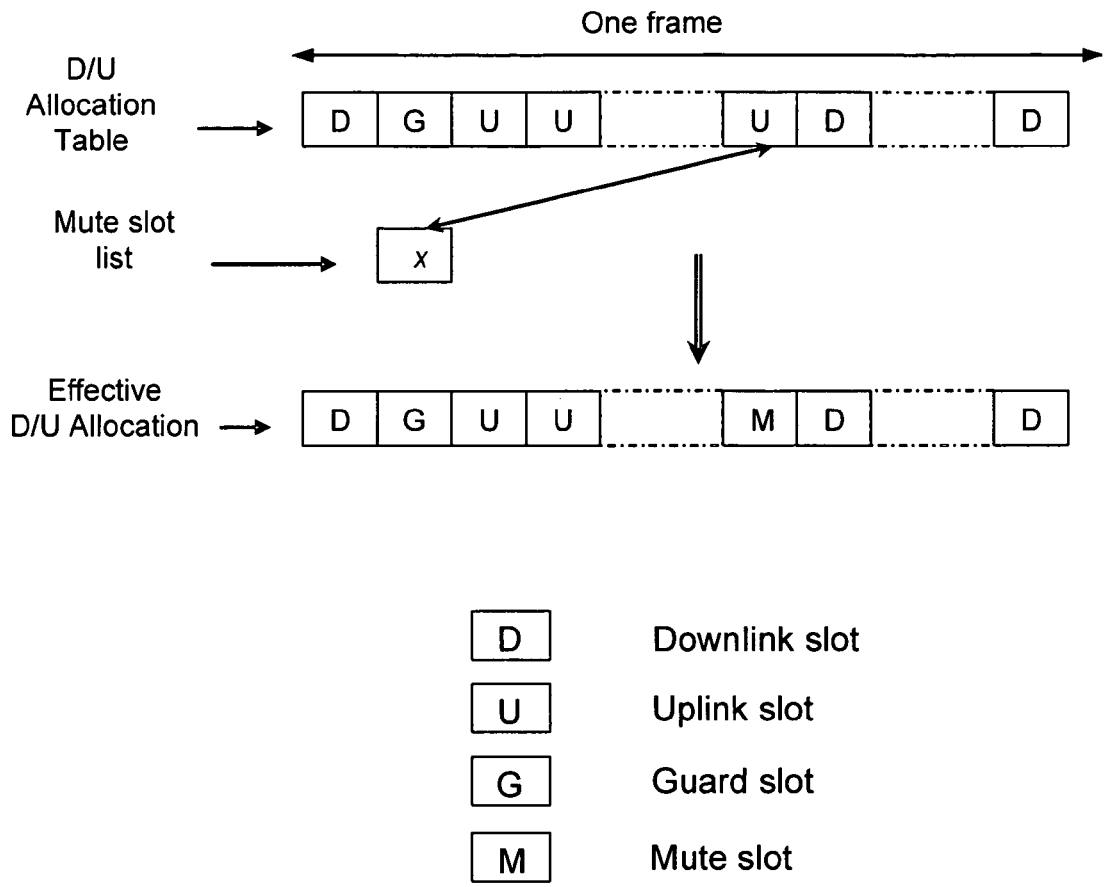
FIG. 5 shows an example of mute slot signaling using a slot list.

FIG. 5 shows an example of mute slot signaling using a slot list. A slot list method can include broadcasting a list of one or more slot indices along with signaling information that indicates a D/U allocation table. In some implementations, a slot is marked as a mute slot if the slot's index within the frame is in a frame's slot list. If not so marked, the slot is either a downlink slot or an uplink slot according to the frame's D/U allocation table. Different implementations can realize different slot list method implementations. For example, mute slots can be adjacent to each other and can follow an uplink slot and to precede a downlink slot, and as a result, the indices in the list can be replaced by the number of muted slots. In some implements, mute slots can be interleaved with other slot types.

A pre-defined allocation table entry method for a slot-TDD frame structure can use pre-defined formats to signal the existence and locations of mute slots. For exampled, a pre-defined format can specify frame patterns with mute slots. A pre-defined allocation table entry method can include the mute slot signaling information in one or more extended entries of a TDD allocation table.

Figure 6:
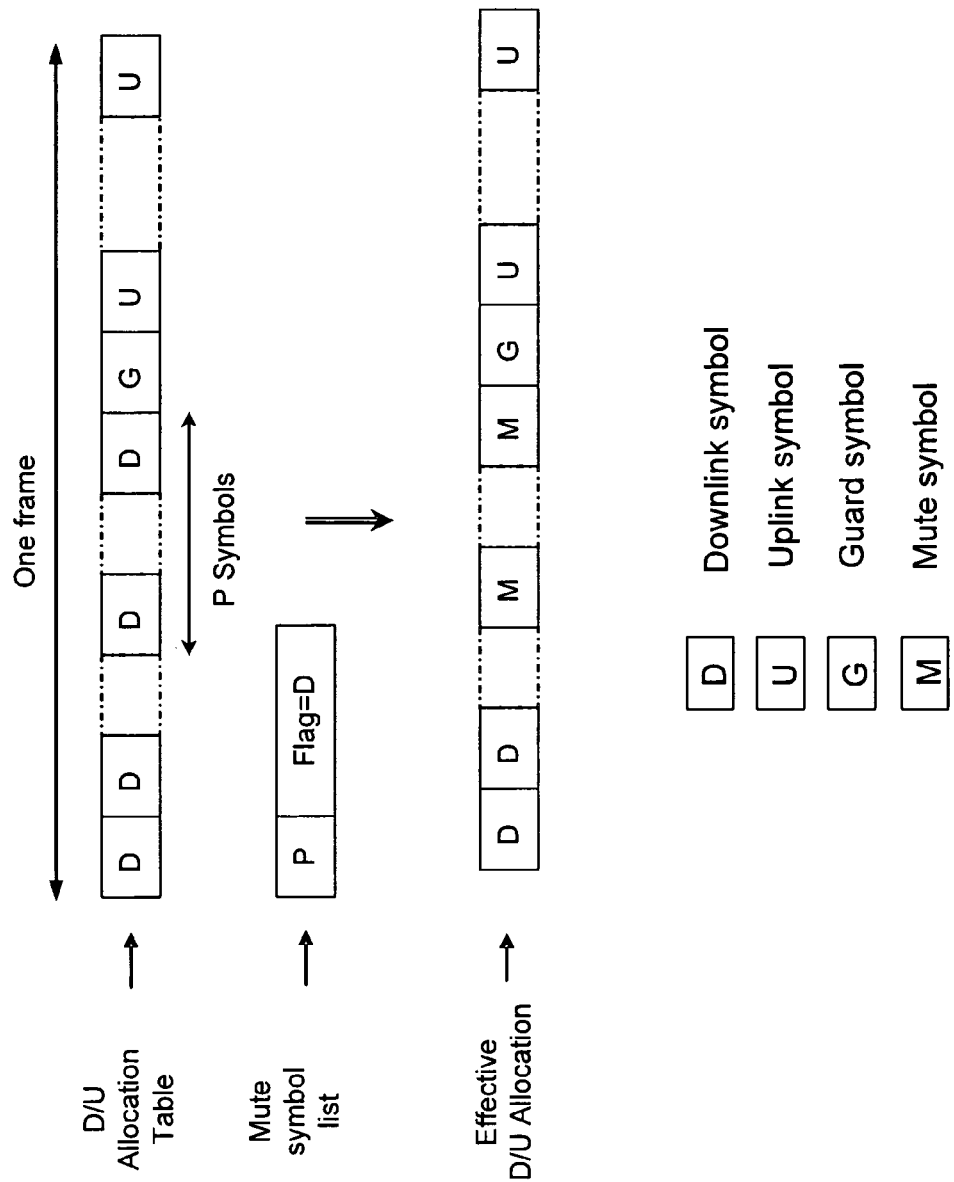
FIG. 6 shows an example of mute symbol signaling using a symbol set.

FIG. 6 shows an example of mute symbol signaling using a symbol set. A symbol set method can include broadcasting a symbol set and D/U allocation information, e.g., the number of downlink/uplink symbols. A symbol set can specify symbol locations within a frame to mark the respective symbols as mute symbols. For example, a symbol set can include one or more indices of symbols in a frame to designated them as mute symbols.

In some implementations, the muted downlink symbols in a broadcast symbol set can construct a continuous mute interval in the time domain because of the timing characteristics of a symbol-TDD frame structure. Further, such a continuous downlink mute interval can be adjacent to a guard period in a frame. In some implementations, the muted uplink symbols in the broadcast symbol set can construct a continuous mute interval in time domain. Further, such a continuous uplink mute interval can be adjacent to a guard period in a frame. In some implementations, a base station can broadcast the indices of mute symbols. In some implementations, a base station can broadcast the number of muted symbols with a flag to indicate whether these symbols are downlink or uplink symbols. In some implementations, a base station can broadcast the starting symbol index for a mute interval with a flag to indicate whether this mute interval is on a downlink or an uplink.

A pre-defined allocation table entry method for a symbol-TDD frame structure can use pre-defined formats to signal the existence and locations of mute symbols. For exampled, a pre-defined format can specify frame patterns with mute symbols. A pre-defined allocation table entry method can include the mute symbol signaling information in one or more extended entries of a TDD allocation table.

During wireless communication, a frame may or may not include a mute interval(s). Zero mute interval signaling can result in a frame without mute intervals. Non-zero mute interval signaling can result in a frame with mute intervals. When a frame does include a mute interval, it may be referred to as non-zero mute interval signaling. Non-zero mute signaling can result in different processing within a radio station such as a base station or a mobile device. A wireless communication can operate using procedures such as delayed-mute or immediate-mute operating procedures. A TDD system can use delayed-mute or immediate-mute operating procedures for non-zero mute interval signaling.

In a delayed-mute example, once a base station sends non-zero mute interval signaling, the base station and mobile device(s) can not transmit new traffic (e.g., traffic not yet scheduled at the time of transmission of the non-zero mute interval signaling) within the mute intervals identified by non-zero mute interval signaling. However, the base station and the mobile device(s) can continue the transmission of traffic already scheduled at the time of transmission of non-zero mute interval signaling within those mute intervals identified by non-zero mute interval signaling. The system should manage to complete all the transmission of the existing traffic within those mute intervals identified by non-zero mute interval signaling based upon certain strategies.

In an immediate-mute example, once a base station sends the non-zero mute interval signaling, both the base station and mobile device(s) can not transmit in the mute intervals identified by non-zero mute interval signaling.

A wireless communication system can specify different operation rule sets for handling mute interval signaling. A core network can establish an operation rule set for base stations and mobile devices under the core network's control.

In some implementations, a base station can conform to the following operation rule, defined as $\mathfrak{R}_{BS}^{DL}$, if the base station is requested to do so by a core network to switch a downlink interval to an uplink interval. $\Psi$ can represent the set of downlink slots or the set of downlink symbols that the core network requests to transit to uplink slots or uplink symbols. The definition of $\mathfrak{R}_{BS}^{DL}$ is as follows. A base station can reserve specific downlink slots or downlink symbols per radio frame to broadcast the content of $\Psi$ on a per-frame basis. The base station can continue normal operations within the slots or symbols that are not in $\Psi$. The base station may not schedule new user traffic within the muted slots or symbols in $\Psi$. The base station can continue the existing downlink user traffic during those muted intervals in $\Psi$. In some implementations, the base station can finish the existing traffic transmission as soon as possible. In some implementations, a local policy of the base station can handle existing downlink user traffic. Once user traffic during the muted intervals in $\Psi$ has terminated, the base station can inform the core network of this termination event, and can stop radio signal transmission, including a common reference signal and common control channels, during these mute intervals. The base station can resume usage of muted intervals, according to a command from a core network. As a result, the base station can broadcast this resume event to mobile devices by, for example, transmitting new mute interval signaling or zero mute interval signaling and a D/U allocation table.

In some implementations, a user equipment can conform to the following operation rule, defined as $\mathfrak{R}_{UE}^{DL}$, upon receiving mute interval signaling to switch a downlink interval to an uplink interval: The definition of $\mathfrak{R}_{UE}^{DL}$ is as follows. $\Psi$ can represent the set of downlink slots or the set of downlink symbols in the mute interval signaling. The definition of $\mathfrak{R}_{UE}^{DL}$ is as follows. For the downlink slots or downlink symbols that are not in non-empty $\Psi$, the user equipment can perform normal operations during these slots or symbols. For the downlink slots or downlink symbols that are in $\Psi$, if the user equipment has no downlink traffic within $\Psi$, then the user equipment can treat the mute intervals in $\Psi$ as an additional guard period, and may not attempt to receive and/or monitor a signal during these intervals. If the mute interval signaling is interpreted as delayed-mute, then the user equipment can monitor, measure, and receive downlink signals within these intervals until all of the user equipment's traffic utilizing these intervals completes. After completion, the user equipment can treat the mute intervals in $\Psi$ as an additional guard period, and shall not attempt to receive and/or monitor any signal during these intervals. If the mute interval signaling is interpreted as immediate-mute, then the user equipment can immediately treat the mute intervals in $\Psi$ as an additional guard period, and may not attempt to receive and/or monitor a signal during these intervals. The user equipment can resume normal operation during the specific muted intervals after receiving a new signaling, which can be zero or non-zero mute interval signaling, along with a D/U allocation table from the base station.

In some implementations, a base station can conform to the following operation rule, defined as $\mathfrak{R}_{BS}^{UL}$, if the base station is requested by a core network to switch an uplink interval to a downlink interval. $\Psi$ represents the set of uplink slots or the set of uplink symbols that the core network requests to transit to downlink slots or downlink symbols. The definition of $\mathfrak{R}_{BS}^{UL}$ is as follows. The base station can reserve specific downlink slots or downlink symbols per radio frame to broadcast the content of $\Psi$ on a per-frame basis. The base station can continue normal operations within the slots or symbols that are not in non-empty $\Psi$. The base station can stop monitoring and receiving uplink signals that any user equipment sends autonomously during those mute intervals in $\Psi$. The base station can continue the reception of scheduled uplink packet(s) during those muted intervals in $\Psi$. In some implementations, the base station can schedule and cooperate with the user equipments to finish the existing uplink traffic transmission during those intervals as soon as possible. In some implementations, a the local policy of the base station and user equipment can handle existing uplink user traffic. Once user traffic during the muted interval in $\Psi$ has terminated, the base station shall can inform the core network of this event. The base station can resume usage of muted intervals, according to the command from core network. The base station can broadcast this event to served user equipments by for example, transmitting a new signaling, which can be zero or non-zero mute interval signaling, along with a D/U allocation table.

In some implementations, a user equipment can conform to the following operation rule, defined as $\mathfrak{R}_{UE}^{UL}$, upon receiving non-zero mute interval signaling to switch an uplink interval to a downlink interval. $\Psi$ can represent the set of uplink slots or the set of uplink symbols in the mute interval signaling The definition of $\mathfrak{R}_{UE}^{UL}$ is as follows. For the uplink slots or uplink symbols that are not in non-empty $\Psi$, the user equipment can perform normal operations during these slots or symbols. For the uplink slots or uplink symbols that are in $\Psi$, if the user equipment has no uplink traffic within $\Psi$, then the user equipment can treat the mute intervals in $\Psi$ as an additional guard period, and may not transmit a signal during these intervals. If the mute interval signaling is interpreted as delayed-mute, then the user equipment can stop any autonomous transmission during these intervals, however, the user equipment can continue to transmit scheduled uplink packet traffic within these interval as in normal operation until the user equipment's user traffic utilizing these intervals completes. After completion, the user equipment can treat the mute intervals in $\Psi$ as an additional guard period, and may not attempt to transmit a signal during these intervals. If the mute interval signaling is interpreted as immediate-mute, then the user equipment can stop immediately all of its user traffic utilizing these intervals, and can treat the mute intervals in $\Psi$ as an additional guard period. The user equipment can resume normal operation during the muted intervals upon a new signaling, which can be zero or non-zero mute interval signaling, along with a D/U allocation table from the base station.

In some implementations of the operation rules, a base station can generate a data structure to specify a location(s) of mute symbols or slot according to one of the following techniques: a slot-mask method or a slot-list method for a slot-TDD frame structure; a symbol-set method for a symbol-TDD frame structure; and a pre-defined allocation table entry method for both slot-TDD and symbol-TDD frame structures.

A wireless communication system can include system functions for creating mute intervals and recovering from the mute intervals. Different finite state machines can be used to describe the operational behavior of the base station (BS) and user equipment (UE). Table 1 gives an example of a finite state machine for the user equipment (UE) and for the base station (BS) along with their associated states, descriptions, and operational rules.

TABLE 1

States and associated descriptions in CN, BS and UE

| | State | Descriptions | Operation rule |
|---|---|---|---|
| UE | A1 | Radio frame does not include a mute interval. UE performs normal operations. | N/A |
| | A2 | Radio frame does include a mute interval(s), and UE has unfinished scheduled traffic in the mute interval(s). In this state, UE can stop autonomous transmission and can finish the scheduled packet traffic as soon as possible. This state exists if mute interval signaling is interpreted as delayed-mute. | $\Re_{UE}^{DL}$ for downlink and $\Re_{UE}^{UL}$ for uplink |
| | A3 | Radio frame does include a mute interval(s), and UE keeps all transmission and/or reception out of the mute interval(s), and UE can stop monitoring in the mute interval. | |
| BS | B1 | Radio frame does not include a mute interval. BS performs normal operations. | N/A |
| | B2 | Radio frame does include a mute interval(s), and there is unfinished scheduled packet traffic in the mute interval(s). In this state, BS can stop scheduling new user traffic to finish already-scheduled packet traffic in the mute interval(s) as soon as possible. For downlink during this state, BS can transmit common reference signals and common control channels. This state exists if mute interval signaling is interpreted as delayed-mute. | $\Re_{BS}^{DL}$ for downlink and $\Re_{BS}^{UL}$ for uplink |
| | B3 | Radio frame does include a mute interval(s), and BS keeps all transmission and/or reception out of the mute interval(s), including the transmission of common reference signals and common control channels. | |

A core network (CN) can request a set of base stations, represented by $\Omega$, to shutdown specific downlink or uplink intervals defined in $\Psi$ via mute signaling by using a mute( ) function. In some implementations, a function to initiate one or more mute intervals, called mute($\Omega$, $\Psi$), can be defined as follows. The core network can send a Mute Request that contains $\Psi$ to all base stations in $\Omega$ through a backhaul network. Upon reception of Mute Request from core network, the base station can send mute interval signaling containing $\Psi$ along with D/U allocation table, and enters state B2 if mute interval signaling is interpreted as delayed-mute or state B3 if mute interval signaling is interpreted as immediate-mute. The delay between reception of Mute Request and transmission of mute interval signaling is decided by base station according to local strategy. Once the base station in state B2 senses that there is no radio signal transmitted within the muted intervals (via its scheduler), it sends a Mute Response to the core network, and enters into the state B3. The reception of the non-zero mute interval signaling can force the user equipment into state A2 if the mute interval signaling is interpreted as delayed-mute, or state A3 if mute interval signaling is interpreted as immediate-mute. Once the user equipment in state A2 has no radio transmission or reception during those mute intervals, the user equipment enters into state A3.

A core network (CN) can requests a set of base stations, represented by $\Omega$, to recover one or more specific muted intervals defined in $\Psi$ to downlink/uplink slots or symbols using a mute_recover( ) function. In some implementations, a function to recover from one or more mute intervals, called mute_recover($\Omega$, $\Psi$), can be defined as follows. The core network can send a Mute_Recover Command that contains $\Psi$ (or equivalently the new D/U allocation table) to all base stations in $\Omega$. Upon receiving this command, the base station shall obtain the new D/U allocation table and transmit it along with the new mute interval signaling that can be zero mute interval signaling. The delay between reception of Mute_Recover Command and transmission of new mute interval signaling is decided by the base station according to a local strategy. Meanwhile, the base station can treat the new D/U allocation table as the current one, and resume the radio signal transmissions during those intervals that are un-muted in the new mute interval signaling. This brings the base station back to state B1 if there are no more mute intervals in the radio frame. In some implementations, the base station sends a Mute_Recover Confirmation to the core network to confirm the base station current D/U allocation table. After receiving the new mute interval signaling, UE returns back to state A1 if there are no more mute intervals in the radio frame. In some implementations, the creation and removal of the mute intervals are asynchronous among the base stations.

Figure 7A:
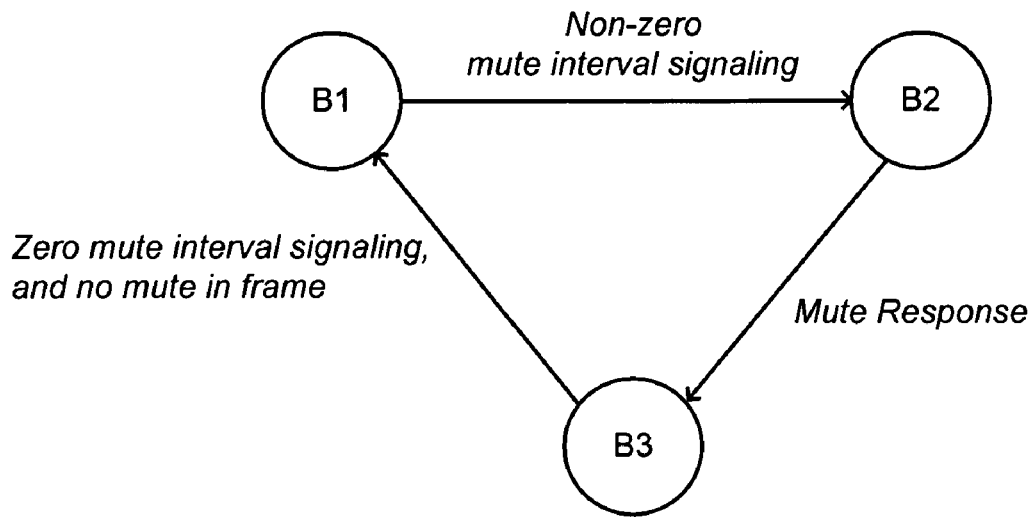
FIGS. 7A,7B show different examples of processing mute intervals in a base station.
Figure 7B:
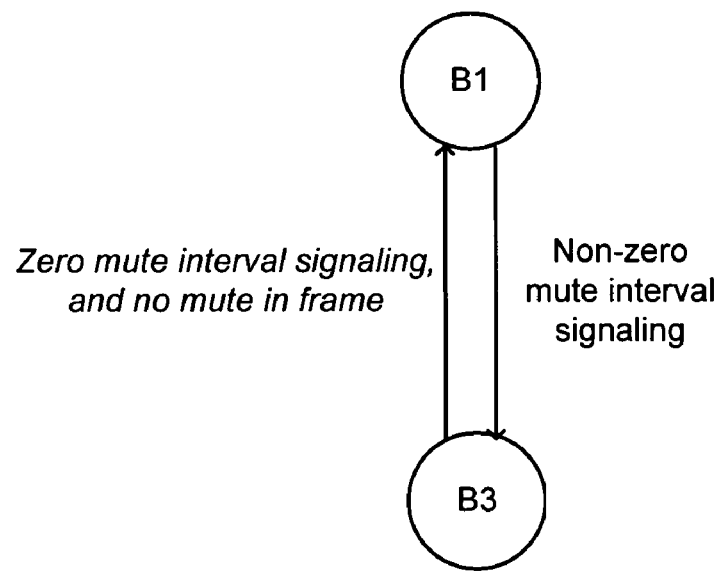
Figure 8A:
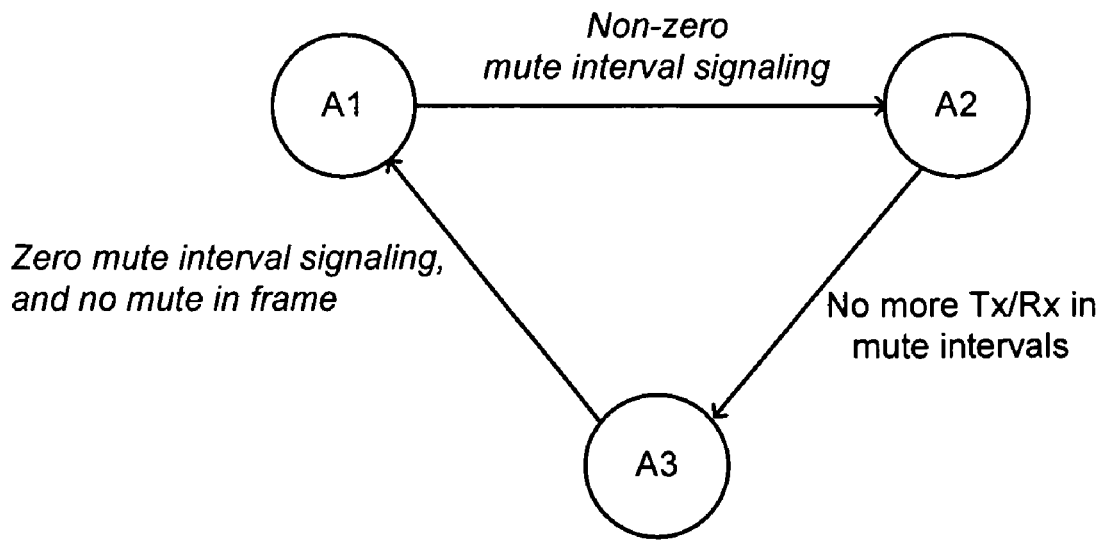
FIGS. 8A,8B show different examples of processing mute intervals in a mobile device.
Figure 8B:
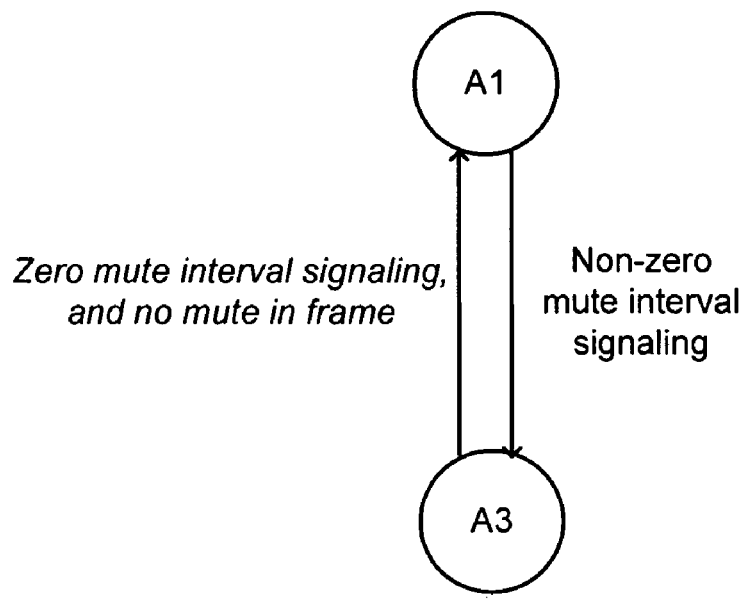
Figure 9A:
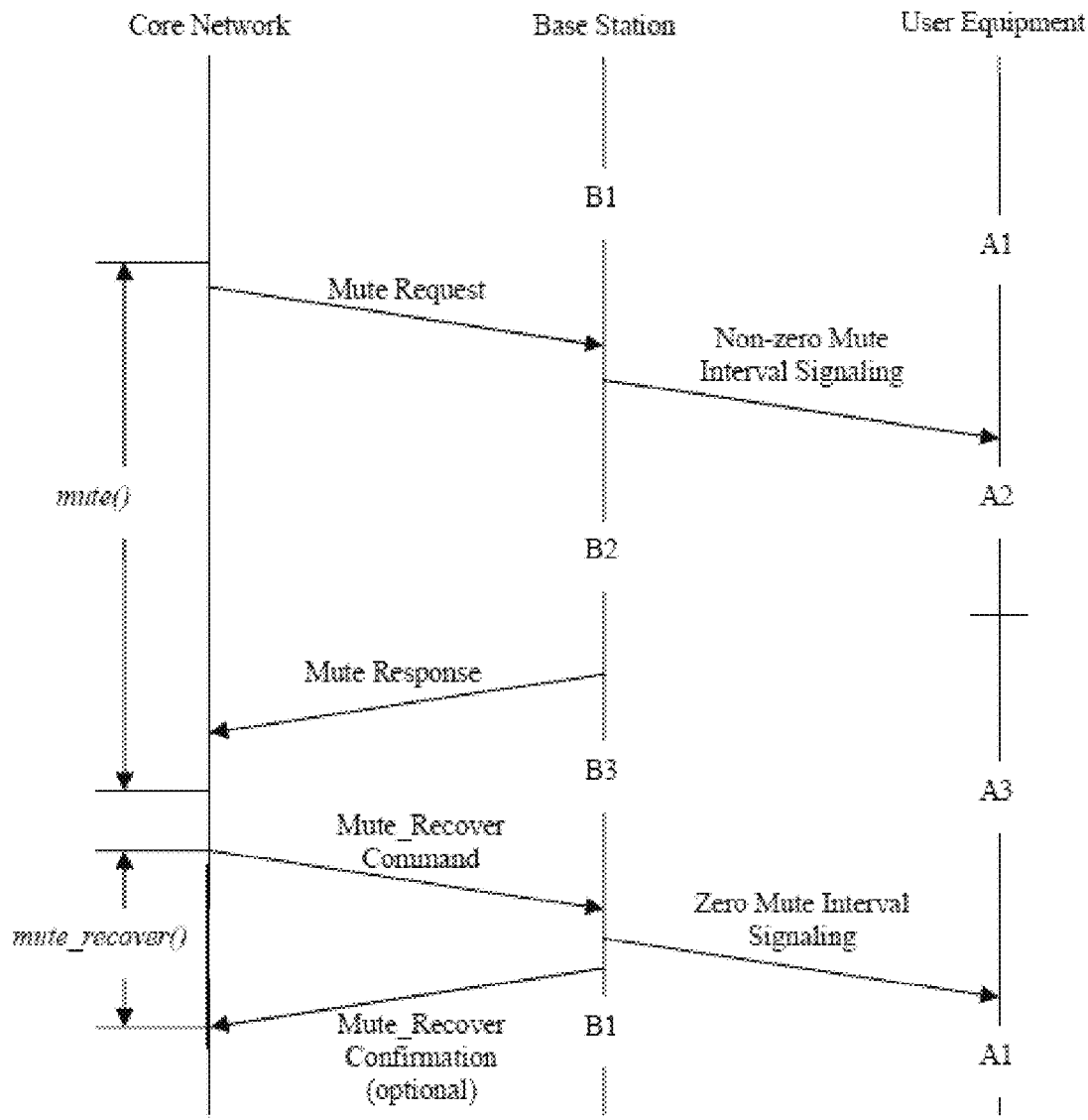
FIGS. 9A,9B show different examples of network flow for mute and mute recover functions.
Figure 9B:
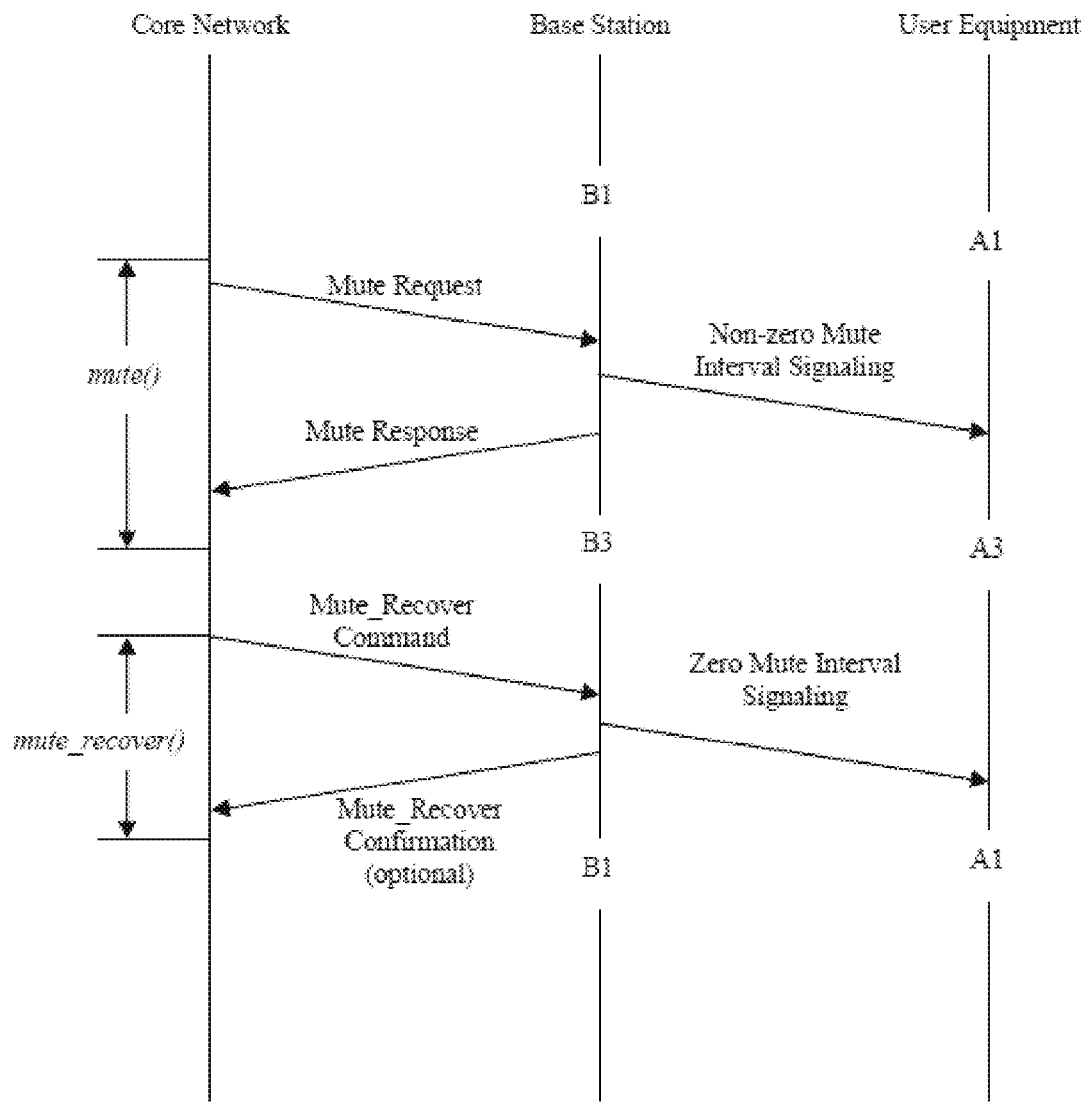

FIGS. 7A, 7B, 8A, 8B, 9A, and 9B show different processing and network flows examples for implementations of the technologies described herein. These figures correspond to Table 1 as described above. FIGS. 7A,7B show different examples of processing mute intervals in a base station. FIG. 7A shows states of a finite state machine (FSM) and transitions between those states using a delayed-mute technique. FIG. 7B shows states of a finite state machine (FSM) and transitions between those states using a immediate-mute technique. FIGS. 8A,8B show different examples of processing mute intervals in a mobile device such as user equipment. FIG. 8A shows states of a finite state machine (FSM) and transitions between those states using a delayed-mute technique. FIG. 8B shows states of a finite state machine (FSM) and transitions between those states using a immediate-mute technique. FIGS. 9A,9B show different examples of network flow for mute and mute recover functions. FIG. 9A shows an example flow for delayed-mute. FIG. 9B shows an example flow for immediate-mute.

A wireless communication system can use mute intervals and associated operation rules and functions for different situations. For example, the system can use the technologies described herein to switch from an old D/U allocation ratio to a new D/U allocation ratio. In another example, the system can use the technologies described herein to maintain a D/U allocation ratio of one service area differently from a D/U allocation ratio of a neighboring area.

A wireless communication system can perform multiple adjustments to a D/U allocation ratio to achieve a target D/U allocation ratio. For example, a TDD wireless system can have a D/U allocation ratio specified by $N_D:N_U$, where $N=N_D+N_U$ is the total number of data slots per frame in slot-TDD frame structure or data symbols per frame in symbol-TDD frame structure. The TDD system needs to change to a target D/U ratio specified by $(N_D+N_0):(N_U-N_0)$. In other words, the system needs to switch $N_0$ uplink slots or symbols to downlink slots or symbols. The procedure of changing the D/U ratio to $(N_D-N_0):(N_U+N_0)$ is similar to that of changing the D/U ratio to $(N_D+N_0):(N_U-N_0)$. A multi-step adjustment scheme can achieve the target D/U ratio. A multi-step adjustment scheme can increase the system's efficiency and can provide optimal trade-off between the maximum instant loss of system capacity and total time spent in this D/U ratio adjustment.

In some implementations, a multi-step adjustment scheme includes the following details. In a K-step D/U ratio adjustment algorithm, let $$N_0 = \sum_{k=1}^{K} N_k.$$

The k-th step adjustment is implemented as changing the D/U ratio from $(N_D+S_{k-1}):(N_U-S_{k-1})$ to $(N_D+S_k):(N_U-S_k)$, where $$S_k = \begin{cases} 0 & k=0 \\ \sum_{l=1}^{k} N_l & k>0. \end{cases}$$

The values of $N_k$ for $1 \leq k \leq K$ are determined by the cellular network operator based upon different criteria. For example, to minimize the maximum of $N_k$, the $(N_0 \mod K)$ identical integers equal to $\lceil N_0/K \rceil$ and $(K-(N_0 \mod K))$ identical integers equal to $\lfloor N_0/K \rfloor$ are distributed to $N_k$ for $1 \leq k \leq K$. The above description can be formulated as algorithm below. Given $N=N_D+N_U$ and $N_0$, the core network can determine parameters K and $N_k$ ($1 \leq k \leq K$) for $$N_0 = \sum_{k=1}^{K} N_k,$$

according to the core network own criteria. The initial D/U ratio is $N_D:N_U$.

A K-step D/U ratio adjustment algorithm can perform the following operations for one step in the adjustment algorithm. The algorithm can initialize a value, k, to 1 and then increment k, after an adjustment, up to and including the Kth value. A core network can call mute($\Omega$, $\Psi$), where $\Omega$ is the all base stations in the network, and $\Psi$ corresponds to $N_k$ uplink slots in a slot-TDD frame structure or $N_k$ uplink symbols in a symbol-TDD frame structure. After the core network receives a Mute Response from one or more base stations in the system's wireless network, (e.g., involved base stations are in state B3 and involved UE are in state A3 regarding to the mute interval in $\Psi$), the core network can call mute_recover($\Omega$, $\Psi$), with the $\Omega$ unchanged and $\Psi$ corresponding to the $N_k$ slots or symbols assigned to downlink, to make the new D/U allocation ratio as $(N_D+S_k):(N_U-S_k)$, where $$S_k = \sum_{l=1}^{k} N_l.$$

After the Kth adjustment, the resulting D/U ratio for base stations within the system is $(N_D+N_0):(N_U-N_0)$.

Figure 10:
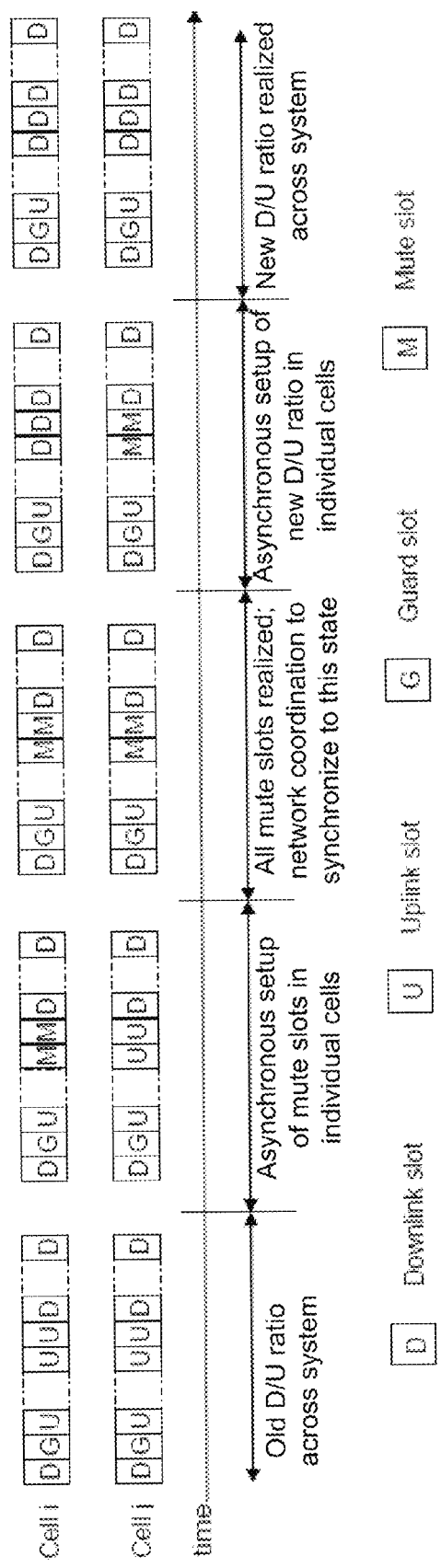
FIG. 10 shows an example of a single step change in a multiple step D/U ratio adjustment for a slot based frame structure.
Figure 11:
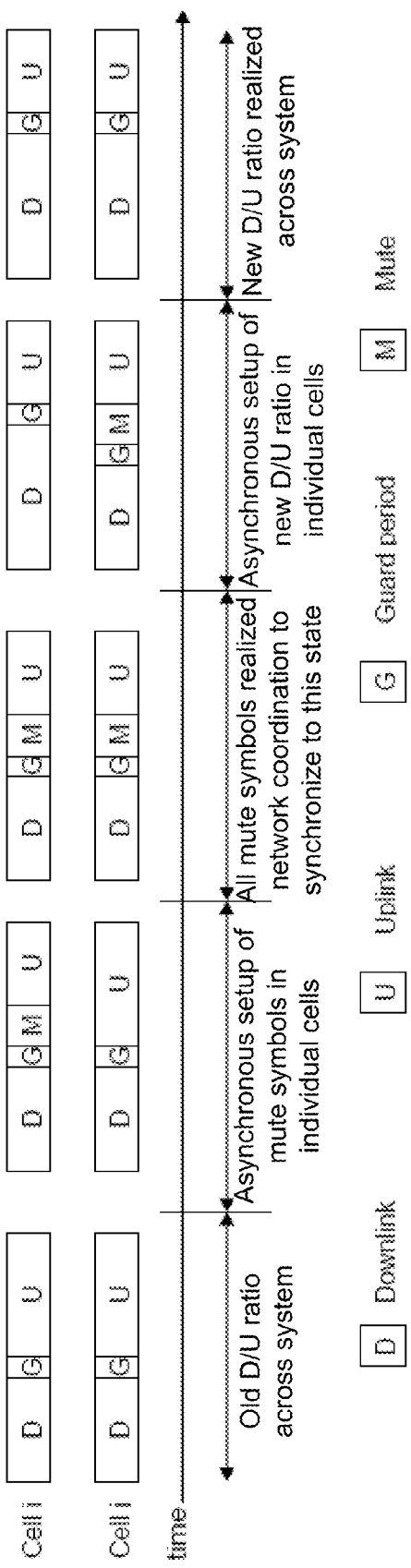
FIG. 11 shows an example of a single step change in a multiple step D/U ratio adjustment for a symbol based frame structure.

FIG. 10 shows an example of a single step change in a multiple step D/U ratio adjustment for a slot based frame structure. FIG. 11 shows an example of a single step change in a multiple step D/U ratio adjustment for a symbol based frame structure. In these two figures, the asynchronous operations among base stations are confirmed.

In some implementations, the maximum instant system capacity loss ratio in a K-step D/U ratio adjustment is given by $$\frac{\max_{k=1}^{K} \{N_k\}}{N} \leq \frac{N_0}{N}.$$

A larger K value can result in a smaller maximum instant system capacity loss. Therefore, if the network operator can tolerate the time spent in the D/U ratio adjustment, the instant system capacity loss ratio during the adjustment can be controlled, e.g., as small as 1/N. As a potential benefit, the user traffic may not be interrupted.

A wireless communication system can maintain a D/U allocation ratio of one service area differently from a D/U allocation ratio of a neighboring area. Similar to a K-step adjustment algorithm that changes a D/U ratio from time instance A to time instance B by spreading the total system capacity loss over that time duration between A and B, a K-tier D/U ratio adjustment method can spread system capacity loss over different base stations. A K-tier D/U ratio adjustment method can maintain a different D/U ratio in service area A from that in service area B.

A wireless communication system can perform K-tier D/U ratio adjustments. A TDD wireless system can have an D/U allocation ratio as $N_D:N_U$, where $N=N_D+N_U$ is the total number of data slots per frame in slot-TDD frame structure or data symbols per frame in symbol-TDD frame structure. The TDD system can change the D/U ratio within a certain area to $(N_D+N_0):(N_U-N_0)$, that is, to switch $N_0$ uplink slots or symbols to the downlink. The case of changing the D/U ratio to $(N_D-N_0):(N_U+N_0)$ is similar to the case for changing the D/U ratio to $(N_D+N_0):(N_U-N_0)$.

In some implementations, a K-tier D/U ratio adjustment algorithm includes the following details. The area for which D/U ratio is kept the same after an adjustment is called tier-0. The area for which the target D/U ratio is desired after the adjustment is called tier-K. Between tier-0 and tier-K there are K−1 tiers called tier-1, tier-2, ... and tier-(K−1). Here, each tier is can be wide enough to isolate the radio signals transmitted from two adjacent tiers. Let $$N_0 = \sum_{k=1}^{K-1} N_k.$$

The values of $N_k$ for $1 \leq k < K$ are determined by the cellular network operator based upon different criteria. For example, to minimize the maximum of $N_k$, the ($N_0$ mod (K−1)) identical integers with value of $\lceil N_0/K-1 \rceil$ and (K−($N_0$ mod (K−1))) identical integers with value of $\lfloor N_0/K-1 \rfloor$ are distributed to $N_k$ for 1≤k<K. A K-tier D/U ratio adjustment method can create one or more mute intervals for the base stations in intermediate tiers but may not recover these mute intervals. At the end of a K-tier adjustment, there are $N_k$ slots or symbols in the k-th tier to be muted. These un-recovered mute intervals can serve as guard period among tiers. There can be at least one tier with un-recovered mute intervals, that is, K>1.

The K-tier D/U ratio adjustment method can include the following operations. Given $N=N_D+N_U$ and $N_0$, the core network can determine parameters K (K>1) and $N_k$(1≤k<K) for $$N_0 = \sum_{k=1}^{K-1} N_k,$$

according to the core network's own criteria. The initial D/U ratio across all tiers is $N_D:N_U$. The algorithm can initialize a value, k, to 1 and then increment k, after an adjustment, up to and including the Kth value. For each value of k, the core network can call mute($\Omega$, $\Psi$), where $\Omega$ includes all base stations in the tiers belonging to the set $\{l|k\leq l\leq K\}$, and $\Psi$ corresponds to $N_k$ uplink slots in slot-TDD frame structure or $N_k$ uplink symbols in symbol-TDD frame structure. After the core network receives Mute Response from base stations in $\Omega$, the core network can call function mute_recover($\Omega'$, $\Psi$), where $\Omega'$ includes all base stations in the tiers belonging to the set $\{l|(k+1)\leq l\leq K\}$, and $\Psi$ corresponds to the $N_k$ slots or symbols assigned to downlink. After the Kth adjustment, the resulting D/U ratio for base stations in the k-th tier is:

$$\begin{cases} N_D:N_U & k=0 \\ (N_D+S_{k-1}):(N_U-S_k) & 0<k<K \\ (N_D+N_0):(N_U-N_0) & k=K, \end{cases}$$

where $$S_k = \begin{cases} 0 & k=0 \\ \sum_{l=1}^{k} N_l & k>0. \end{cases}$$

In some implementations, the maximum instant system capacity loss ratio per tier in the K-tier D/U ratio adjustment is given by $$\frac{\max_{k=1}^{K} \{N_k\}}{N} \leq \frac{N_0}{N}.$$

A larger K value can result in a smaller maximum instant system capacity loss. Therefore, if the network operator can tolerate the effected area size during the D/U ratio adjustment, the instant system capacity loss ratio during the adjustment can be controlled, e.g., as small as 1/N. As a potential benefit, the user traffic may not be interrupted.

Figure 12:
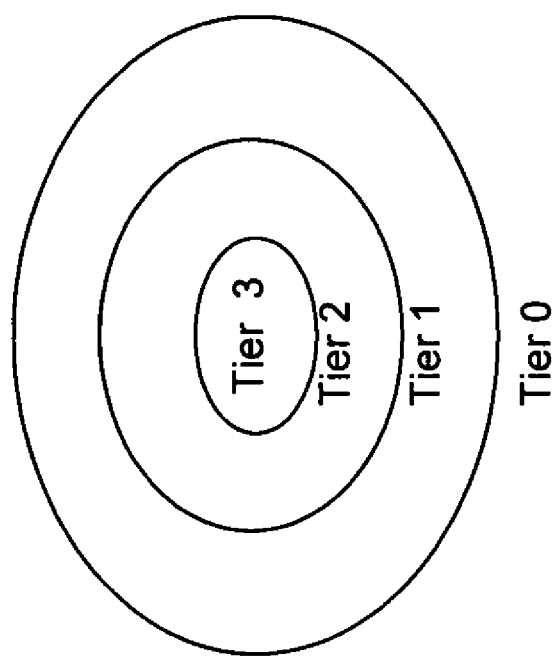
FIG. 12 shows an example of a multi-tier layout map with different D/U allocation ratios.
Figure 13:
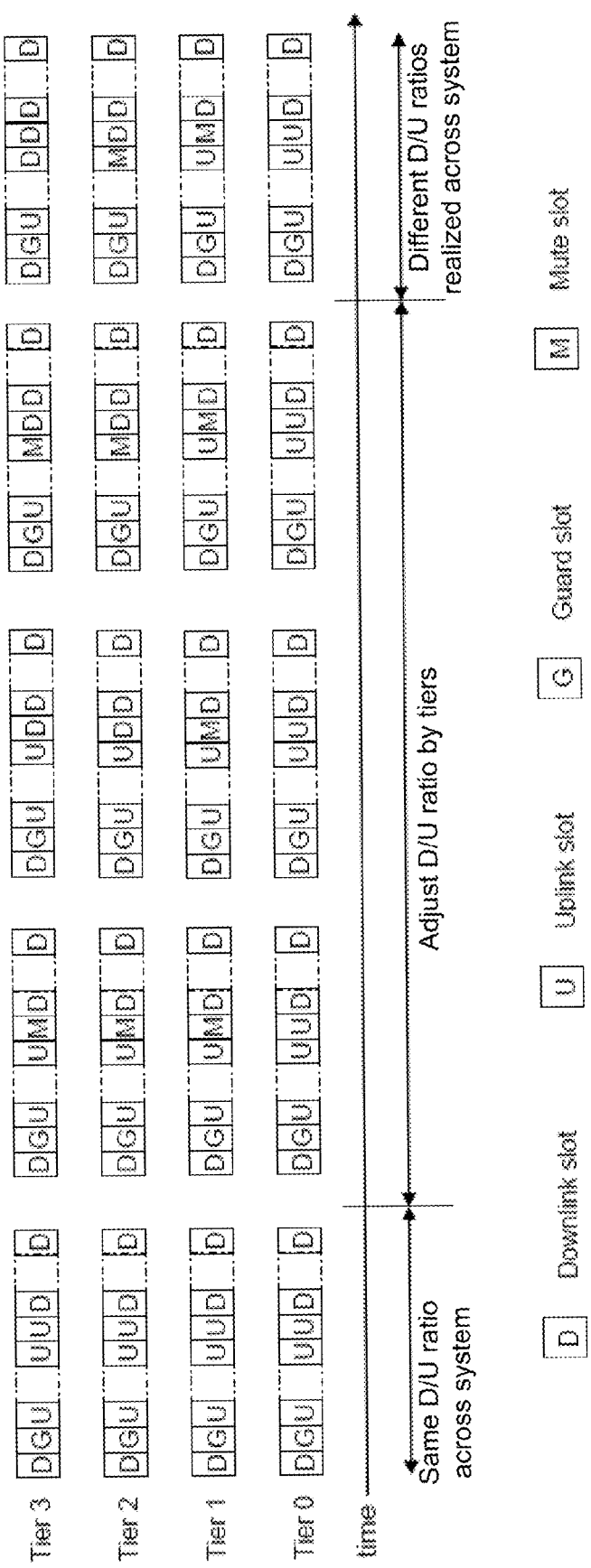
FIG. 13 shows an example of a K-tier D/U ratio adjustment algorithm for a slot based frame structure.
Figure 14:
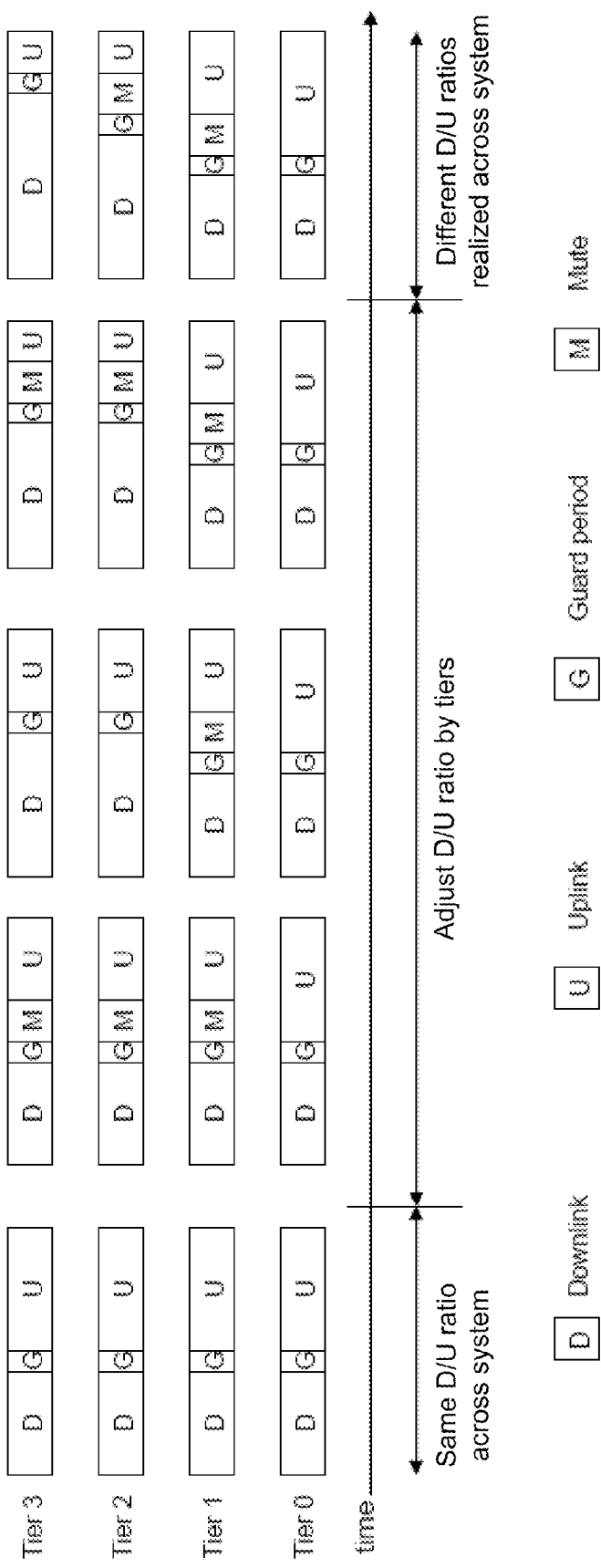
FIG. 14 shows an example of a K-tier D/U ratio adjustment algorithm for a slot based frame structure.

FIG. 12 shows an example of a multi-tier layout map with different D/U allocation ratios. The map includes different service area controlled by a core network. In this example, the whole service area initially has identical D/U allocation ratios. In order to increase the D/U ratio in tier-3 area, a K=3 tier layout is created, and the D/U ratio is increased tier-by-tier as moving from tier-0 towards tier-3. FIG. 13 and FIG. 14 shows the K-tier adjustment procedure for this example. FIG. 13 shows an example of a K-tier D/U ratio adjustment algorithm for a slot based frame structure. FIG. 14 shows an example of a K-tier D/U ratio adjustment algorithm for a slot based frame structure.

Figure 15:
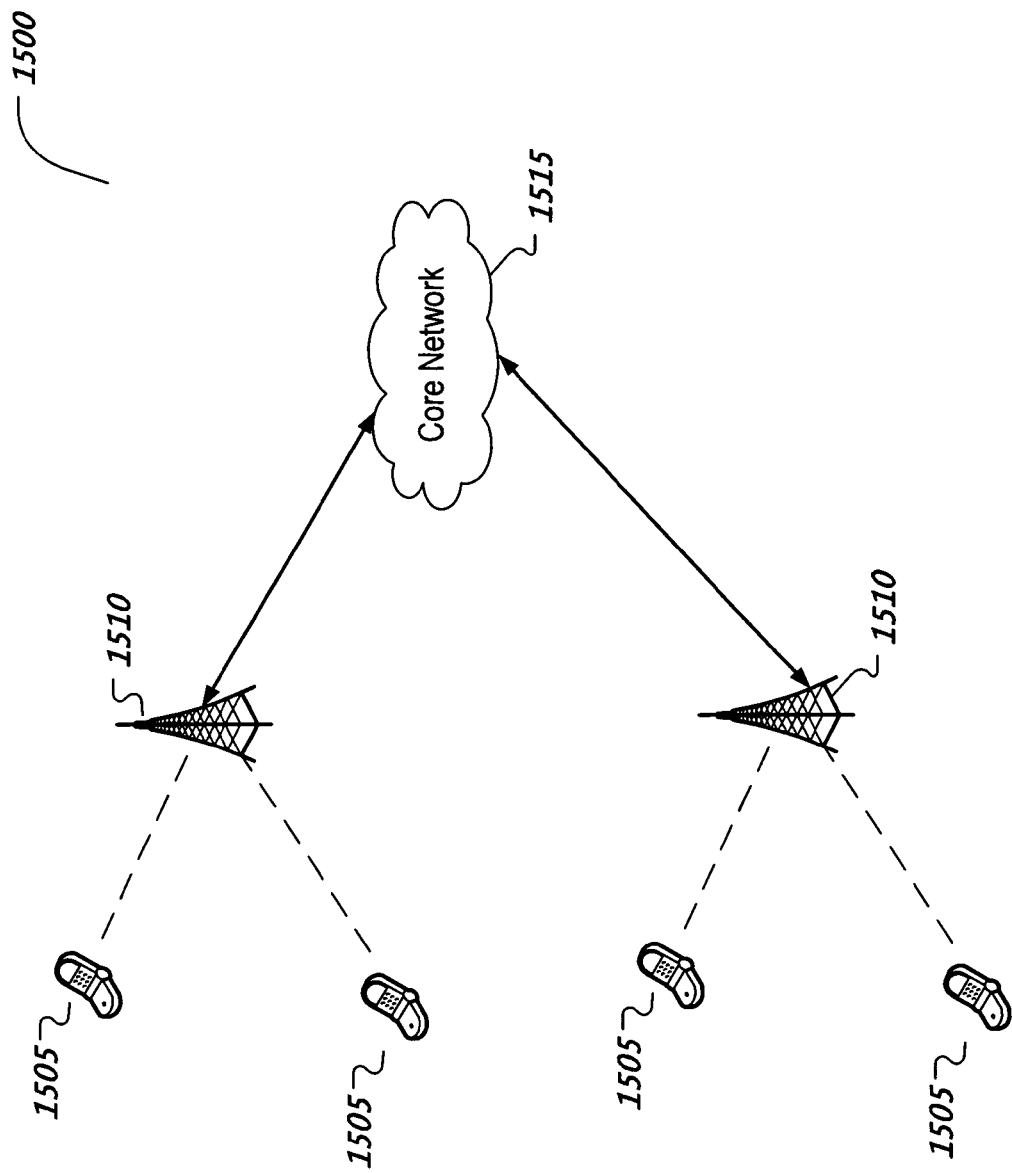
FIG. 15 shows an example of a wireless communication system.

FIG. 15 shows an example of a wireless communication system, such as a TDD wireless communication system. System 1500 can include a network of base stations (BSs) 1510 for communicating with one or more mobile devices 1505 such as subscriber stations, mobile stations, user equipment, wireless air cards, mobile phones, and other wireless devices. In some implementations, a mobile device can have a fixed location, e.g., a desktop computer with a wireless air card. A core network 1515 can include one or more controllers to control one or more base stations 1510. A controller can include processor electronics such as a processor(s) or specialized logic. A controller's functionality can be split into multiple components within a core network 1515.

Mobile devices 1505 can be a mobile unit or a fixed unit. A fixed unit can be located and/or relocated anywhere within the coverage area of system 100. Fixed unit wireless device can include, for example, desktop computers and computer servers. Mobile units can include, for example, mobile wireless phones, Personal Digital Assistants (PDAs), mobile devices, mobile computers.

A base station 1510 in system 1500 can include a radio transceiver. A base station 1510 can transmit signals to a mobile device 1505 via downlink radio signals. A mobile device 1505 in system 1500 can include a radio transceiver. A mobile device 1505 can transmit signals to a base station 1505 via uplink radio signals.

Figure 16:
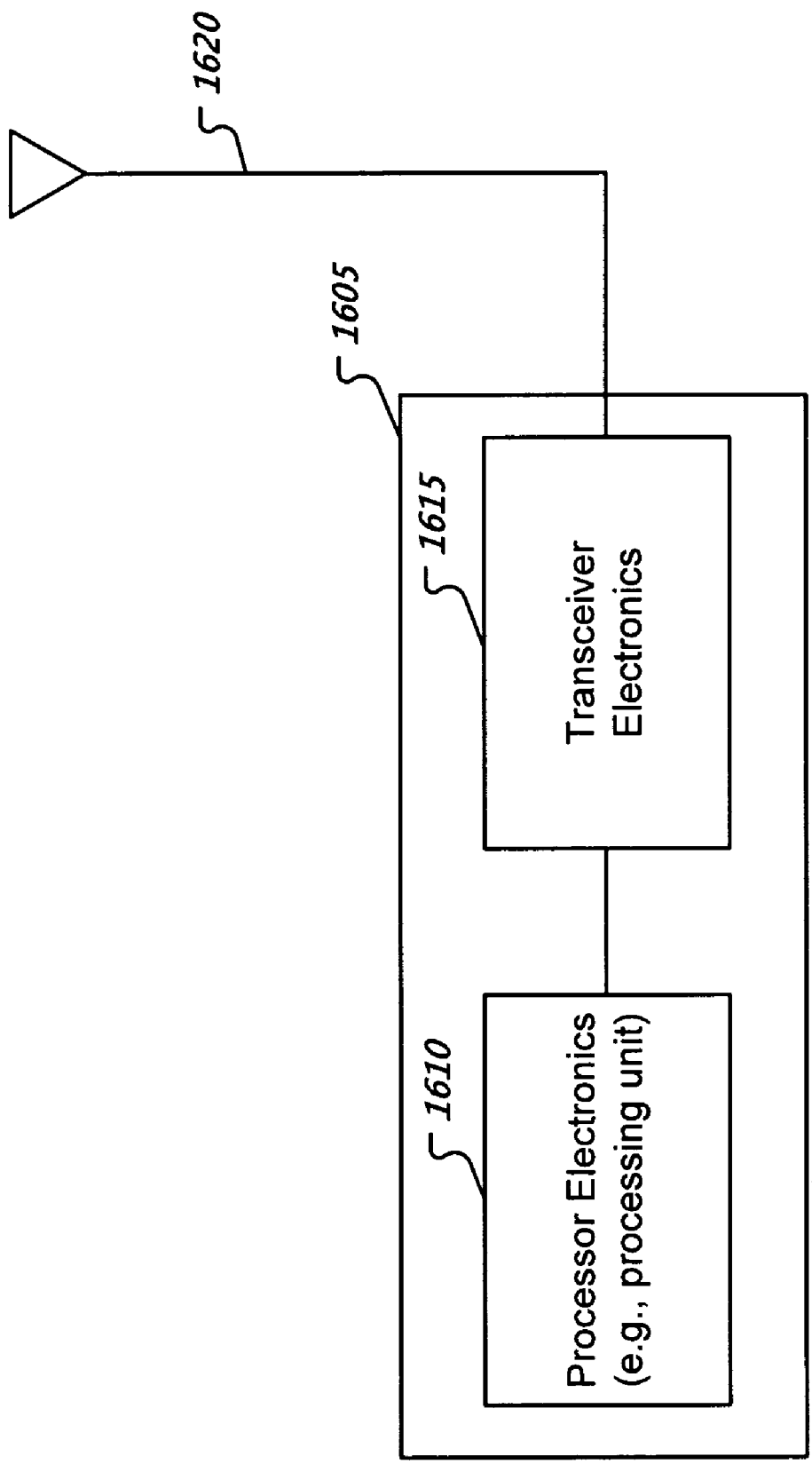
FIG. 16 shows an example of a radio station architecture.

FIG. 16 shows an example of a radio station architecture. A radio station 1605 such as a base station or a mobile device can include processor electronics 1610. Processor electronics 1610 can include a processing unit configured to perform one or more operations or techniques described herein. A processing unit can include one or more specialized or general propose processors and/or specialized logic. A radio station 1605 can include transceiver electronics 1615 to send and/or receive wireless signals over a communication interface such as antenna 1620. Radio station 1605 can include other communication interfaces for transmitting and receiving data. In some implementations, a processing unit can be configured to implement some or all of the functionality of a transceiver.

Figure 17A:
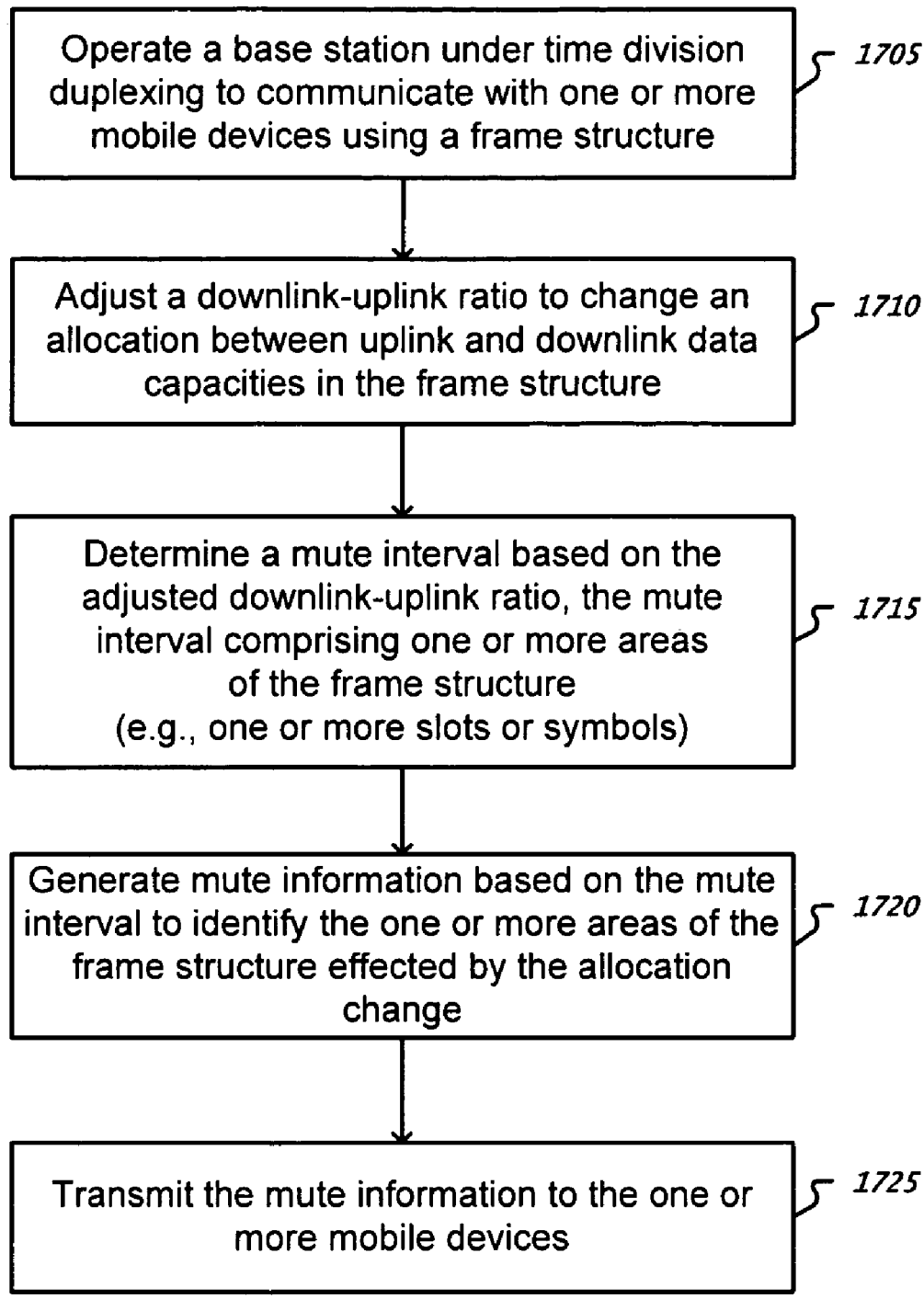
FIG. 17A,17B show different examples of mute operation processes on a base station.

FIG. 17A shows an example process of a mute operation on a base station. A base station can operate 1705 under time division duplexing to communicate with one or more mobile devices using a frame structure. The base station can adjust 1710 a downlink-uplink ratio to change an allocation between uplink and downlink data capacities in the frame structure. In some implementations, a core network can control the base station to make the adjustment.

The base station can determine 1715 a mute interval based on the adjusted downlink-uplink ratio, the mute interval can include one or more areas of the frame structure. Determining the mute interval can include selecting an uplink or downlink interval within the frame structure as the mute interval. In some implementations, a mute interval can include one or more slots in the frame structure. In some implementations, a mute interval can include one or more symbols in the frame structure. A mute interval can include adjacent or nonadjacent areas in the frame structure.

The base station can generate 1720 mute information based on the mute interval to identify the one or more areas of the frame structure effected by the allocation change. The base station can transmit 1725 the mute information to the one or more mobile devices. In some implementations, a base station can transmit data including an D/U allocation table and mute information to the one or more mobile devices. Some implementations can combine a D/U allocation table and mute information.

Figure 17B:
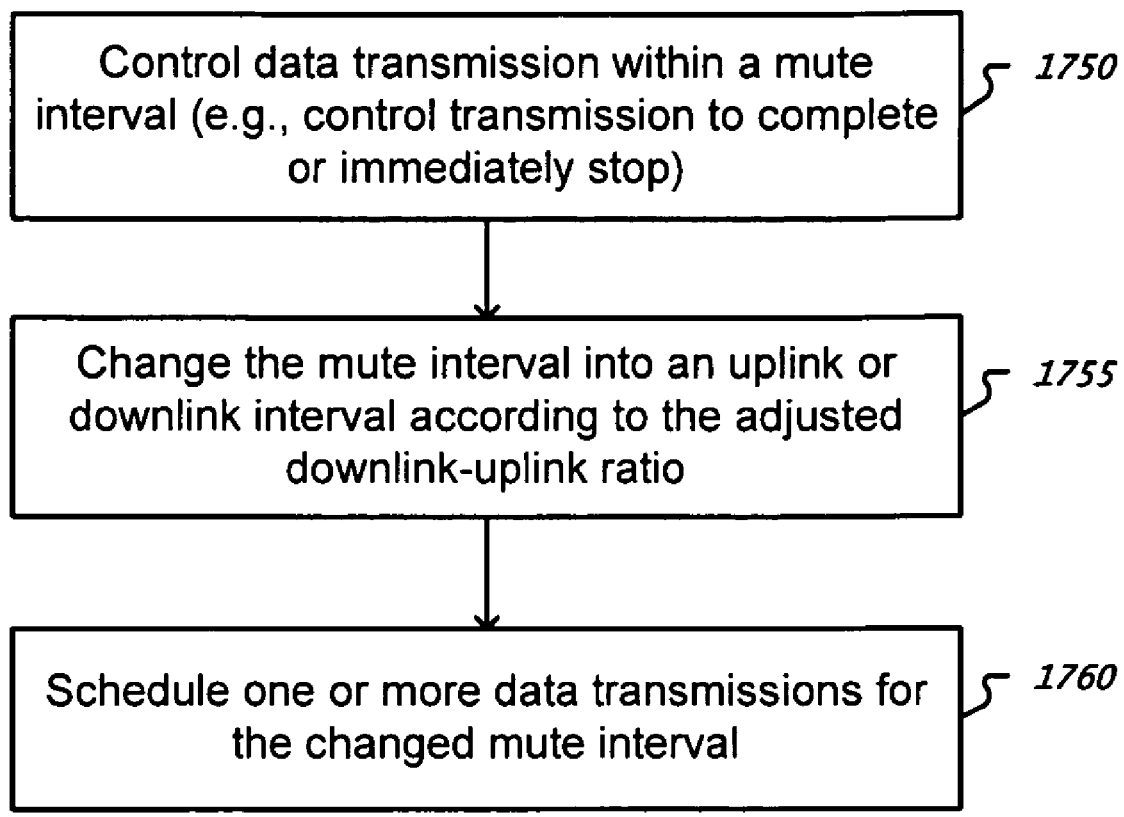

FIG. 17B shows an example process of a mute operation on a base station. A base station can control 1750 data transmission within the mute interval, e.g., control data transmission to complete or immediately stop. The base station can change 1755 the mute interval into an uplink or downlink interval according to the adjusted downlink-uplink ratio. In some implementations, a base station can monitor activity with the mute interval, and after activity ceases, the base station can change the mute interval into an uplink or downlink interval. The base station can schedule 1760 one or more data transmissions for the changed mute interval, e.g., the new uplink or downlink interval.

Figure 18:
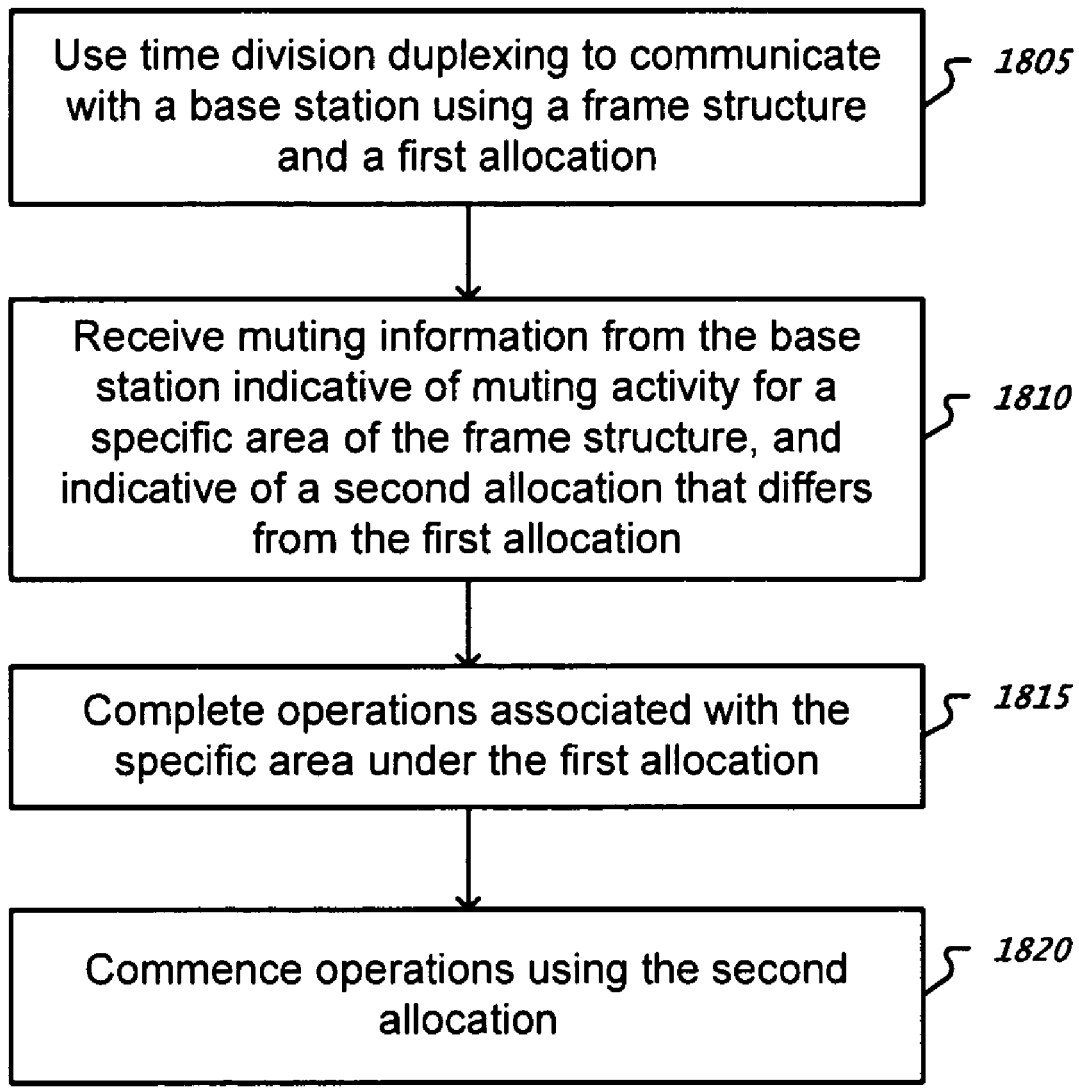
FIG. 18 shows an example process of a mute operation on a mobile device.

FIG. 18 shows an example process of a mute operation on a mobile device. A mobile device can use 1805 time division duplexing to communicate with a base station using a frame structure and a first allocation. The frame structure can include uplink and downlink data areas. The first allocation can include a total size of the uplink area and a total size of the downlink area. The mobile device 1810 can receive muting information from the base station indicative of muting activity for a specific area of the frame structure. The specific area can include one or more slots or one or more symbols. Multiple slots in a specific area can be adjacent or nonadjacent within a frame structure. The muting information can be indicative of a second allocation that differs from the first allocation.

The mobile device can complete operations 1815 associated with the specific area under the first allocation and can commence 1820 operations using the second allocation. For example, a mobile station can complete operations, such as stopping a data transmission in the specific area, and can commence operations using the second allocation such as receiving data in the specific area. In another example, a mobile station can complete operations, such as receiving data transmission in the specific area, and can commence operations using the second allocation such as transmitting data in the specific area.

In some implementations, a communication link between a base station and a user equipment can be established (the communication link can include a first frame of downlink intervals for the base station to transmit to the user equipment and uplink intervals for the user equipment to transmit to the base station); and a location of a mute interval can be transmitted on a downlink interval of the first frame. The mute interval can replace a downlink interval or an uplink interval from a previous frame to change a downlink to uplink allocation ratio.

In some implementations, a mute interval, corresponding to a mute slot in the slot-TDD frame structure or mute symbol in the symbol-TDD frame structure, can be used to indicate a stop of all radio transmissions during the interval. A slot mask method can be used by the base station to signal the mute slots to user equipments in the slot-TDD frame structure. A slot list method can be used by the base station to signal the mute slots to user equipments in the slot-TDD frame structure. A symbol set method can be used by the base station to signal the mute symbols to user equipments in the symbol-TDD frame structure, where the mute symbols are contiguous and the constructed mute interval is adjacent to the guard period in symbol-TDD frame structure. The pre-defined allocation table entry method can be used by the base station to signal to user equipment the mute slots in the slot-TDD frame structure and the mute symbols in the symbol-TDD frame structure.

In some implementations, a base station can conform to an operation rule defined by $\Re_{BS}^{DL}$, when switching certain downlink interval to uplink interval. The user equipment can conform to an operation rule defined by $\Re_{UE}^{DL}$, when switching certain downlink interval to uplink interval. The base station can conform to an operation rule defined by $\Re_{BS}^{UL}$, when switching certain uplink interval to downlink interval. The user equipment can conform to an operation rule defined by $\Re_{UE}^{UL}$, when switching certain uplink interval to downlink interval.

In some implementations, a network function mute( ) can include a non-zero mute interval signaling from base station to user equipment. The network function mute( ) can include a Mute Request from the core network to the base station, and the Mute Response from the base station to the core network. The network function mute_recover( ) can include zero mute interval signaling from base station to user equipment. The network function mute_recover( ) can include a Mute Recover Command from the core network to the base station, and the optional Mute Recover Confirmation from the base station to the core network.

In some implementations, a K-step D/U ratio adjustment algorithm can be use to dynamically change the D/U allocation ratio in the network. The K-tier D/U ratio adjustment algorithm can be used to maintain the D/U allocation ratio of one area differently from that of other areas.

The described techniques can be used to dynamically change the downlink-to-uplink allocation ratio in scenarios such as (1) the network needs to switch from an old D/U allocation ratio to a new value; and (2) the network needs to keep the D/U allocation ratio of one service area differently from the one of the neighboring area. One or more of the following features may be achieved in various implementations during the dynamic change of D/U allocation ratio: eliminating synchronized switching operation among base stations; minimizing the instant system capacity loss based on the control by the network operator without interrupt frame from view-point of network; minimizing or eliminating interrupt to the user traffic; application of the described techniques in both slot-TDD frame structure and symbol-TDD frame structure.

The disclosed and other embodiments and the functional operations described in this patent application can be implemented in digital electronic circuitry, or in computer software, firmware, or hardware, including the structures disclosed in this patent application and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this patent application can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications and enhancements to the described examples and implementations and other implementations may be made based on what is disclosed. For example, some wireless systems may have different terminologies for aspects discussed above. For example, a slot can be named or can include a subframe or a frame in some wireless system. Further, in some wireless systems where a slot includes a frame, a superframe can include multiple such slots. Different TDD systems may have different protocol interpretations for the technologies described herein.

What is claimed is:

1. A method for dynamically changing a downlink-uplink allocation, comprising:
    establishing a communication link between a base station and a user equipment, wherein the communication link comprises downlink intervals for the base station to transmit to the user equipment and uplink intervals for the user equipment to transmit to the base station; and
    generating a mute interval to replace a downlink interval or an uplink interval in a previous flame to effect a change in a downlink-uplink allocation ratio for a subsequent frame, the mute interval indicating that transmissions during the mute interval should cease; and
    transmitting a location of the mute interval to the user equipment using a frame structure;
    operating a core network to send a mute request to the base station to initiate the change in the downlink-uplink allocation ratio;
    operating the base station to send a mute response to the core network; and
    operating the core network to send a mute recovery request to the base station.

2. The method of claim 1, wherein the frame structure includes a slot-TDD frame structure, wherein the mute interval corresponds to one or more slots within the subsequent frame.

3. The method of claim 1, wherein the frame structure includes a symbol-TDD frame structure, wherein the mute interval corresponds to one or more mute symbols within the subsequent frame, and the mute interval indicates that transmissions during the mute interval should cease.

4. The method of claim 3, wherein the mute symbols are contiguous and the mute interval is adjacent to a guard period within the subsequent frame.

5. The method of claim 1, further comprising:
    generating a data structure to specify the location of the mute interval, wherein the data structure is one of a bit mask data structure, a list data structure, a symbol set data structure, or a pre-defined allocation table entry structure, wherein transmitting the location comprises transmitting the data structure.

6. The method of claim 1, wherein generating the mute interval comprises generating information to indicate a presence of a mute slot in a specific slot of the frame structure, wherein the mute interval comprises the mute slot.

7. The method of claim 6, further comprising:
    changing a downlink slot in the frame structure to the mute slot; and
    operating the base station to either complete or immediately stop data transmission in the mute slot.

8. The method of claim 7, further comprising:
    changing the mute slot to an uplink slot; and controlling the user equipment to transmit in the uplink slot.

9. The method of claim 6, further comprising:
changing an uplink slot in the frame structure to the mute slot; and
operating the user equipment to either complete or immediately stop data transmission in the mute slot.

10. The method of claim 9, further comprising:
changing the mute slot to a downlink slot; and
operating the base station to transmit in the downlink slot.

11. The method of claim 1, wherein generating the mute interval comprises generating information to indicate a presence of a mute symbol in a specific symbol of the frame structure, wherein the mute interval comprises the mute symbol.

12. The method of claim 11, further comprising:
changing a downlink symbol in the frame structure to the mute symbol; and
operating the base station to either complete or immediately stop data transmission in the mute symbol.

13. The method of claim 12, further comprising:
changing the mute symbol to an uplink symbol; and
controlling the user equipment to transmit in the uplink symbol.

14. The method of claim 11, further comprising:
changing an uplink symbol in the frame structure to the mute symbol; and
operating the user equipment to either complete or immediately stop data transmission in the mute symbol.

15. The method of claim 14, further comprising:
changing the mute symbol to a downlink symbol; and
operating the base station to transmit in the downlink symbol.

16. The method of claim 1, wherein generating the mute interval comprises generating a bit-mask data structure to identify one or more slots in the frame structure effected by a muting operation.

17. The method of claim 1, wherein generating the mute interval comprises generating a list data structure to identify one or more slots of the frame structure effected by a muting operation.

18. The method of claim 1, wherein generating the mute interval comprises generating a set data structure to identify one or more symbols of the frame structure effected by a muting operation.

19. The method of claim 1, wherein generating the mute interval comprises generating one or more pre-defined allocation table entries to identify one or more areas of the frame structure effected by a muting operation.

20. The method in claim 1, wherein the mute request includes the information indicative of specific intervals to be muted in the frame structure.

21. The method in claim 20, wherein the mute request includes one of the following data structures defining one or more specific intervals in the frame structure: a bit mask data structure, a list data structure, a set data structure, and pre-defined allocation table entries.

22. The method in claim 1, wherein the mute response is sent from the base station after the base station has no communication activities in the mute interval.

23. The method in claim 1, wherein the mute recovery request includes information indicative of a specific current mute interval of the frame structure that is to be changed to either a downlink interval or an uplink interval.

24. The method in claim 23, wherein the mute recovery request includes one of the following data structures defining specific intervals in the frame structure: a bit mask data structure, a list data structure, a set data structure and pre-defined allocation table entries.

25. The method in claim 1, further comprising:
operating the base station to send a mute recovery confirmation to the core network,
wherein the mute recovery confirmation is sent from base station after the base station resumes usage of the specific mute intervals of the frame structure for either uplink or downlink transmissions.

* * * * *